(12) United States Patent
Parkinson et al.

(10) Patent No.: US 12,488,462 B2
(45) Date of Patent: Dec. 2, 2025

(54) SYSTEMS AND METHODS FOR ASSESSING PET RADIOLOGY IMAGES

(71) Applicant: MARS, INCORPORATED, McLean, VA (US)

(72) Inventors: Mark Justin Parkinson, Newark, NJ (US); Michael Fitzke, Verden (DE); Joseph Conrad Stack, Chicago, IL (US); André Dourson, Haguenau (FR)

(73) Assignee: Mars, Incorporated, McLean, VA (US)

( * ) Notice: Subject to any disclaimer, the term of this patent is extended or adjusted under 35 U.S.C. 154(b) by 204 days.

(21) Appl. No.: 18/256,311

(22) PCT Filed: Dec. 15, 2021

(86) PCT No.: PCT/US2021/063609
§ 371 (c)(1),
(2) Date: Jun. 7, 2023

(87) PCT Pub. No.: WO2022/132967
PCT Pub. Date: Jun. 23, 2022

(65) Prior Publication Data
US 2024/0054637 A1    Feb. 15, 2024

Related U.S. Application Data

(60) Provisional application No. 63/274,482, filed on Nov. 1, 2021, provisional application No. 63/215,769, filed
(Continued)

(51) Int. Cl.
*G06T 7/00* (2017.01)
*G06F 40/40* (2020.01)
(Continued)

(52) U.S. Cl.
CPC ............ *G06T 7/0012* (2013.01); *G06F 40/40* (2020.01); *G06T 7/70* (2017.01); *G06V 10/764* (2022.01);
(Continued)

(58) Field of Classification Search
CPC ............... G06T 7/0012; G06T 7/70; G06T 2207/10116; G06T 2207/20081;
(Continued)

(56) References Cited

U.S. PATENT DOCUMENTS 10,755,413 B1    8/2020 Putha et al.
2019/0325308 A1*  10/2019 Chung .................. G06F 40/216
(Continued)

FOREIGN PATENT DOCUMENTS

WO    WO 2017/151759 A1    9/2017
WO       2019160557 A1    8/2019

OTHER PUBLICATIONS

International Search Report mailed Mar. 10, 2022 for International Application No. PCT/US2021/063609.
(Continued)

*Primary Examiner* — Van D Huynh
(74) *Attorney, Agent, or Firm* — Baker Botts L.L.P.

(57) ABSTRACT

In one embodiment, the disclosure provides a computer-implemented method comprising: receiving a first labeled training data set comprising a first plurality of images each associated with a set of labels; programmatically training a machine learning neural Teacher model on the first labeled training data set; programmatically applying a machine learning model trained for NLP to an unlabeled data set comprising digital electronic representations of natural language text summaries of a second plurality of images, thereby generating a second labeled training data set comprising the second plurality of images; using the machine
(Continued)

learning neural Teacher model, programmatically generating soft pseudo labels; programmatically generating derived labels using the soft pseudo labels; training one or more programmed machine learning neural Student models using the derived labels; receiving a target image; and applying an ensemble of one or more of the Student models to output one or more classifications of the target image.

20 Claims, 25 Drawing Sheets

Related U.S. Application Data on Jun. 28, 2021, provisional application No. 63/125,912, filed on Dec. 15, 2020.

(51) Int. Cl.
*G06T 7/70* (2017.01)
*G06V 10/764* (2022.01)
*G16H 30/20* (2018.01)

(52) U.S. Cl.
CPC .... *G16H 30/20* (2018.01); *G06T 2207/10116* (2013.01); *G06T 2207/20081* (2013.01); *G06T 2207/20084* (2013.01); *G06T 2207/30004* (2013.01)

(58) Field of Classification Search
CPC . G06T 2207/20084; G06T 2207/30004; G06F 40/40; G06V 10/764; G06V 2201/033; G06V 10/7753; G06V 10/82; G06V 20/50; G16H 30/20; A61B 6/468; A61B 6/508; A61B 6/521; G06N 3/045; G06N 3/08; G06N 3/084
See application file for complete search history.

(56) References Cited

U.S. PATENT DOCUMENTS

| | | | |
|---|---|---|---|
| 2019/0378006 A1* | 12/2019 | Fukuda | G06N 3/08 |
| 2020/0027210 A1 | 1/2020 | Haemel et al. | |
| 2020/0160979 A1 | 5/2020 | Lyman et al. | |
| 2020/0211695 A1 | 7/2020 | Zheng et al. | |
| 2020/0380313 A1* | 12/2020 | Keshwani | G06T 7/143 |
| 2021/0216822 A1* | 7/2021 | Paik | G06F 3/167 |
| 2021/0216825 A1* | 7/2021 | Sedai | G06N 3/08 |
| 2022/0076078 A1* | 3/2022 | Vdovjak | G06N 3/08 |
| 2022/0083840 A1* | 3/2022 | Luong | G06N 3/088 |
| 2022/0188636 A1* | 6/2022 | Pham | G06N 3/08 |
| 2022/0318621 A1* | 10/2022 | Gong | G06N 3/006 |
| 2023/0089026 A1* | 3/2023 | Tran | A61B 6/48 705/2 |
| 2023/0334291 A1* | 10/2023 | Parameswaran | G06N 3/045 |
| 2024/0144566 A1* | 5/2024 | Bagherinezhad | G06N 3/045 |

OTHER PUBLICATIONS

Shorten, Self-Training for Natural Language Understanding, pp. 1-10 (2020).

Fitzke et al., RapidRead: Global Deployment of State-of-the-art Radiology AI for a Large Veterinary Teleradiology Practice, pp. 1-16 (2021).

Arsomngern et al., "Computer-Aided Diagnosis for Lung Lesion in Companion Animals from X-ray Images Using Deep Learning Techniques," 2019 IEEE 10th International Conference on Awareness Science and Technology (ICAST), Oct. 23, 2019, pp. 1-6.

Extended European Search Report dated Oct. 8, 2024 in Application No. EP 21907745.

Xie et al., "Self-Training With Noisy Student Improves ImageNet Classification," 2020 IEEE/CVF Conference on Computer Vision and Pattern Recognition (CVPR), Jun. 13, 2020, pp. 10684-10695.

\* cited by examiner

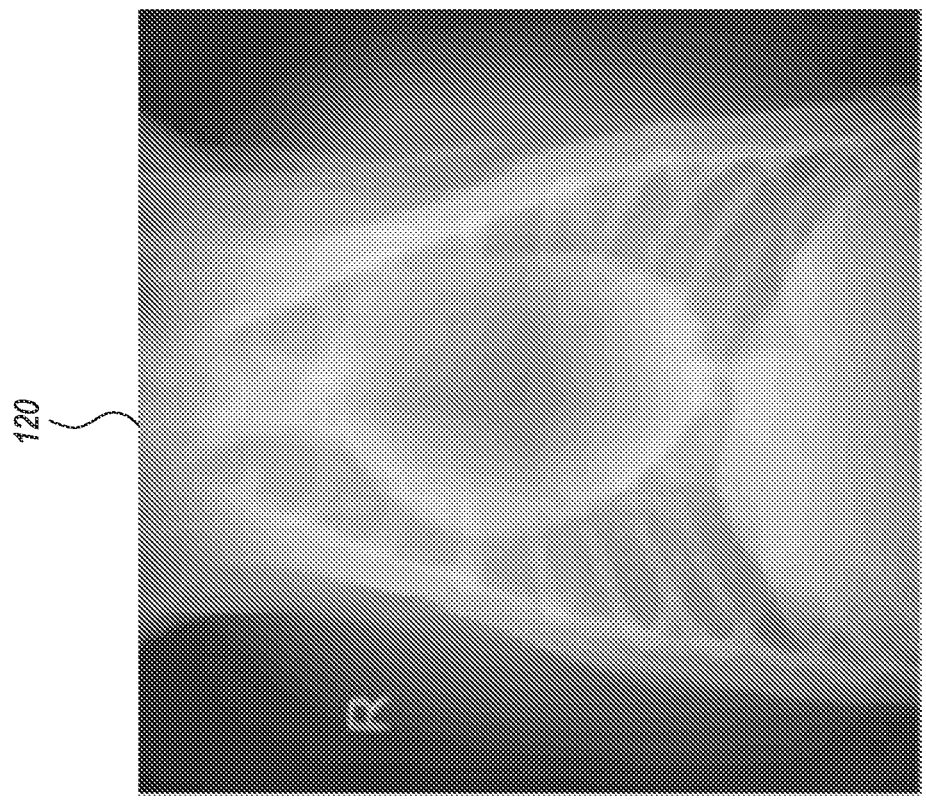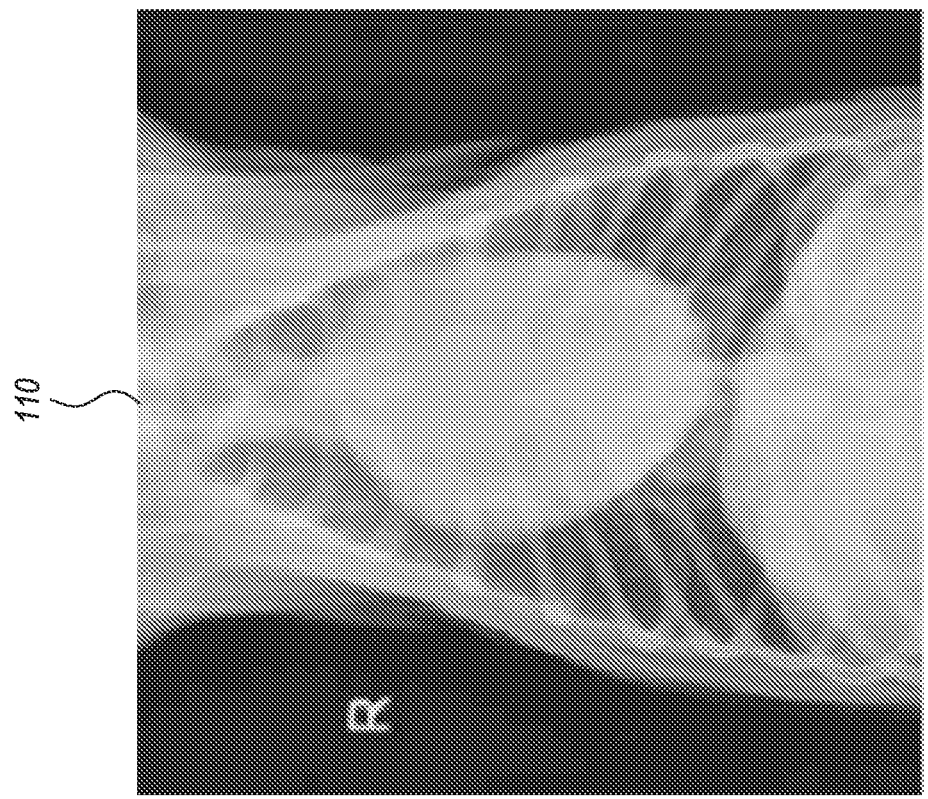
FIG. 1

Other - Please identity

Select The species (required)
☐ Dog
☐ Cat

Select The Category
☐ Normal
☐ Abdomen
☐ Whole body image
☐ Not Suitable for Diagnosis
☑ Abnormal Cardiovascular
☐ Cardiomegaly
☐ Right Ventricular Enlargement
☐ Left Ventricular Enlargement
☐ Right Atrial Enlargement
☐ Left Atrial Enlargement
☐ Aortic Abnormality
☐ Main Pulmonary Artery Enlargement
☐ Mass Pulmonary Structures
☐ Interstitial - Unstructured
☐ Interstitial - Nodule
☐ Alveolar
☐ Interstitial
☐ Vascular
☐ Pulmonary Mass Mediastinal Structures
☐ Oesophagal Dilation
☐ Tracheal Collapse
☐ Tracheal Deviation
☐ Lymphnode enlargement
☐ Mass

210

220

Pleural Space
☐ Pleural Effusion
☐ Pneumothorax
☐ Pleural Mass

Extra Thoracic
☐ Spondylosis
☐ Cervical trachea collapse/trachealis laxity
☐ Degenerative joint disease
☐ Gastric distention
☐ Abdominal effusion/loss of detail
☐ Intervertebral disc disease
☐ Luxation/Sub Luxation
☐ Aggressive lesion
☐ Hepatomegaly
☐ Foreign Material In Stomach
☐ Mass/nodule/lipoma

*FIG. 2*

SYSTEMS AND METHODS FOR ASSESSING PET RADIOLOGY IMAGES

CROSS-REFERENCE TO RELATED APPLICATIONS

This application is a U.S. National Stage Patent Application under 35 U.S.C. § 371 of International Patent Application No. PCT/US2021/063609, filed Dec. 15, 2021, which claims the benefit under 35 U.S.C. § 119 of provisional application 63/274,482, filed Nov. 1, 2021, provisional application 63/215,769, filed Jun. 28, 2021, and provisional application 63/125,912, filed Dec. 15, 2020, the entire contents of which are hereby incorporated by reference for all purposes as if fully set forth herein.

TECHNICAL FIELD

This disclosure relates generally to using one or more machine learning models or tools for assessing pet or animal radiology images.

BACKGROUND

An increasing number of veterinarians utilize image based diagnostic techniques, such as X-rays, in order to diagnose or identify health issues in animals or pets. The number of veterinary trained radiologists throughout the world, however, is less than 1,100. Accordingly, many veterinarians are unable to leverage the advantages offered by image based diagnostic techniques. Even for those veterinarians who are trained in radiology, reviewing medical images can be time consuming and cumbersome. Exacerbating these difficulties, animal or pet radiology images can be oriented incorrectly and/or have missing or incorrect laterality markers. A need therefore exists for a system which can automate the processing and interpretation of diagnostic pet images and return clinically reliable results to radiology trained or non-radiology trained veterinarians.

SUMMARY OF PARTICULAR EMBODIMENTS

In certain non-limiting embodiments, the disclosure provides systems and methods for training and using machine learning models to process, interpret, and/or analyze radiological digital images of animals or pets. An image can be of any digital image storage format used in the diagnosis of medical conditions, such as Digital Imaging and Communications in Medicine ("DICOM"), as well as other formats which are used to display images. In particular embodiments, radiographic images can be labelled using an automated natural language processing ("NLP") tool: In one computer-implemented method, the NLP tool accepts representations of natural language text summaries of radiographic images as input and outputs image labels or tags that characterize the radiographic images. In one embodiment, the natural language text summaries of the radiographic images are radiology reports. In one embodiment, the radiographic images and corresponding NLP-generated tags can be used as training data to train one or more machine learning classifier models that are configured or programmed to classify animal or pet radiographic images. In other non-limiting embodiments, a veterinary radiology expert can manually label various images. In particular embodiments, one or more machine learning classifier models can be trained with manually-labeled training data, such as medical images tagged by the veterinary radiology expert or another type of human domain-specific expert. As explained further herein, machine learning models implemented in some embodiments can effectively use a mixture of NLP-generated labeled training data and human-generated labeled image training data.

In one embodiment, the disclosure provides systems and methods for automated classification of animal or pet radiographic images. In various embodiments, the analyzing and/or classifying of the captured, collected, and/or received image(s) can be performed using one or more machine learning models or tools. In some embodiments, the machine learning models can include a neural network, which can be a convolutional neural network ("CNN"). The machine learning models can be used to classify images with a variety of tags, labels, or classifications. Such classifications can, for example, indicate healthy tissue or the presence of an abnormality. In one embodiment, an image classified as having an abnormality can be further classified, for example, as cardiovascular, pulmonary structures, mediastinal structures, pleural space, and/or extra thoracic. In this disclosure, such classifications within classifications can be referred to as subclassifications.

In one embodiment, the disclosure provides techniques for training and using a programmed machine learning model (denoted "RapidReadNet" in this document, in some instances) to classify a pet radiology image, wherein RapidReadNet can be an ensemble of individual, calibrated deep neural network Student models, as described further herein with more specificity. The term RapidReadNet, and each other term or label in this disclosure that is similar, is used in this disclosure solely for convenience and brevity to facilitate a concise explanation; other embodiments can implement functionally equivalent tools, systems, or methods without using the term RapidReadNet. In one embodiment, a machine learning neural Teacher model can be trained first using a first human-labeled image training data set. An NLP model can then be used to label a larger unlabeled image training data set comprising medical images associated with natural language text summaries. For example, a data set can comprise radiology reports. The Teacher model can then be used to generate soft pseudo labels on the larger image data set. Finally, the soft pseudo labels can be used in conjunction with the NLP derived labels to further generate more derived labels and one or more machine learning neural Student models can be trained using these derived labels. In one embodiment, RapidReadNet can comprise an ensemble of said Student models.

In one embodiment, the disclosure provides systems and methods for automated determination of correct anatomical orientation in veterinary radiographs without relying on DICOM metadata or laterality markers. One disclosed method can comprise using a trained machine learning model ("AdjustNet") comprising two submodels ("RotationNet" and "FlipNet"). In some embodiments, each of RotationNet and FlipNet can be programmed as an ensemble of a plurality of CNNs. In one embodiment, the RotationNet model can be used to determine whether an image, such as an animal or pet radiographic image, is rotated correctly. In one embodiment, the FlipNet model can be used to determine whether an image, such as an animal or pet radiographic image, should be flipped. In one embodiment, AdjustNet and/or RotationNet and/or FlipNet can be incorporated into an end-to-end system or pipeline for the classification of animal or pet radiographic images having numerous technical advantages over reported state-of-the-art systems. The terms AdjustNet, RotationNet, and FlipNet, and each other term or label in this disclosure that is similar, are used in this disclosure solely for convenience and brevity to facilitate a concise explanation; other embodiments can implement functionally equivalent tools, systems, or methods without using the terms AdjustNet, RotationNet, or FlipNet.

In various embodiments, each of RotationNet and FlipNet can be programmed and/or trained in any of several ways. For example, each model can be a single model or a two-stage model. In non-limiting embodiments, multiple different weight initialization techniques can be used for developing models. For example, a transfer learning approach can be performed using model weights pre-trained (e.g., on ImageNet), or the models can be initialized randomly and then further pre-trained on augmented data. In non-limiting embodiments, one or more different training pipelines can also be used for developing the models. For example, each of RoationNet and FlipNet can be pre-trained with augmented data and then fine-tuned with real data. In other embodiments, one or both models can be jointly trained with augmented and real data.

In one embodiment, the disclosure provides an end-to-end system or pipeline for the classification of animal or pet radiographic images. In this context, "end-to-end" can mean that the system or pipeline is configured to receive digital image data as input and to output classification data or labels. As explained further herein with more specificity, said end-to-end system or pipeline can comprise using AdjustNet to determine the correct anatomical orientation of a target image and RapidReadNet to classify said target image. In one embodiment, another trained model can be used validate that the target image corresponds to a correct body part after determining the correct anatomical orientation of the target image (using AdjustNet) and before outputting the one or more classifications of the target image (using RapidReadNet). In one embodiment, an infrastructure pipeline can rely on micro-services that can be deployed using software containers, using libraries such as DOCKER from Docker, Inc. or KUBERNETES from Google, LLC, and callable using application programming interfaces that use Representational State Transfer (ReSTful APIs). In one embodiment, an AI Orchestrator container can be programmed for coordinating the execution of the inferences from different AI modules, such as the AdjustNet and RapidReadNet models. The disclosure provides one example novel non-limiting system architecture upon which certain methods or techniques provided by this disclosure can be implemented, but others are possible.

The embodiments disclosed herein are only examples, and the scope of this disclosure is not limited to them. Certain non-limiting embodiments can include all, some, or none of the components, elements, features, functions, operations, or steps of the embodiments disclosed herein. Embodiments according to the invention are in particular disclosed in the attached claims directed to a method. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

In the drawings:

FIG. 1 illustrates a radiograph image before and after it has been processed by the one or more machine learning models or tools according to certain non-limiting embodiments.

FIG. 2 illustrates the labelling and annotating of an image according to certain non-limiting embodiments.

DESCRIPTION OF EXAMPLE EMBODIMENTS

Figure 3:
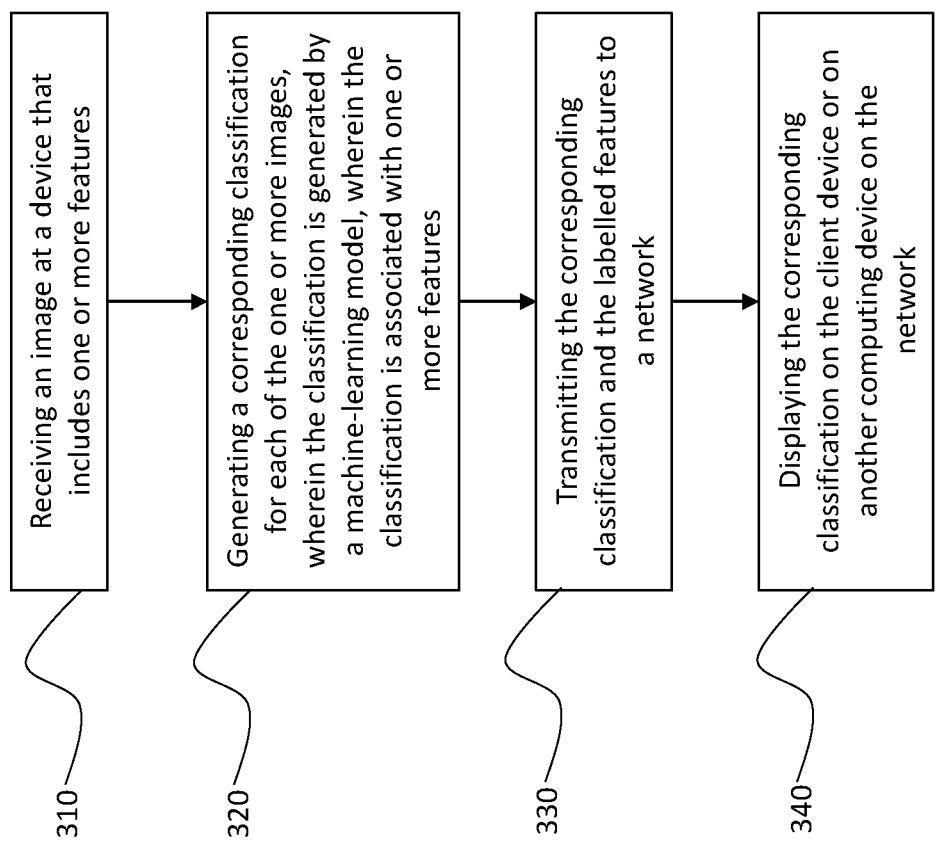
FIG. 3 illustrates an example method for using machine learning systems to assess animal and/or pet images.

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

Embodiments are Disclosed in Sections According to the Following Outline 1.0 General Overview
2.0 Machine Learning Techniques for Processing Pet Radiology Images
   2.1 Example Pet Radiology Image for Classification
   2.2 Labels for Pet Radiology Images
   2.3 Classifying Pet Radiology Images in One Embodiment
3.0 AdjustNet: Automated Techniques for the Orientation of Pet Radiology Images
   3.1 Input Data and Workflow
   3.2 Model Development
   3.3 Model Deployment
   3.4 User Feedback
4.0 End-to-End Pet Radiology Image Processing using RapidReadNet
   4.1 Image Data Sets for Training RapidReadNet in One Embodiment
   4.2 Neural Model Training Techniques for an Image Classification Task
   4.3 Drift Analysis, Experimental Results, and Longitudinal Drift Analysis
   4.4 System Architecture and Methods for RapidReadNet in One Embodiment
5.0 Benefits of Certain Embodiments
   5.1 Example Technical Benefits of AdjustNet and RotationNet
   5.2 Example Technical Benefits of RapidReadNet and the Disclosed End-to-end System for Classifying Pet Radiology Images of One Embodiment
6.0 Implementation Example—Hardware Overview

1.0 General Overview

As used in the specification and the appended claims, the singular forms "a," "an" and "the" include plural referents unless the context clearly dictates otherwise.

As used herein, the terms "comprises," "comprising," or any other variation thereof, are intended to cover a non-exclusive inclusion, such that a process, method, article, system, or apparatus that comprises a list of elements does not include only those elements but can include other elements not expressly listed or inherent to such process, method, article, or apparatus.

As used herein, the terms "animal" or "pet" as used in accordance with the present disclosure refers to domestic animals including, but not limited to, domestic dogs, domestic cats, horses, cows, ferrets, rabbits, pigs, rats, mice, gerbils, hamsters, goats, and the like. Domestic dogs and cats are particular non-limiting examples of pets. The term "animal" or "pet" as used in accordance with the present disclosure can further refer to wild animals, including, but not limited to bison, elk, deer, venison, duck, fowl, fish, and the like.

As used herein, the "feature" of the image or slide can be determined based on one or more measurable characteristics of the image or slide. For example, a feature can be a blemish in the image, a dark spot, a tissue having a various size, shape, or a light intensity level.

In the detailed description herein, references to "embodiment," "an embodiment," "one embodiment," "in various embodiments," "certain embodiments," "some embodiments," "other embodiments," "certain other embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "device" refers to a computing system or mobile device. For example, the term "device" can include a smartphone, a tablet computer, or a laptop computer. In particular, the computing system can comprise functionality for determining its location, direction, or orientation, such as a GPS receiver, compass, gyroscope, or accelerometer. A client device can also include functionality for wireless communication, such as BLUETOOTH communication, near-field communication (NFC), or infrared (IR) communication or communication with wireless local area networks (WLANs) or cellular-telephone network. Such a device can also include one or more cameras, scanners, touchscreens, microphones, or speakers. Client devices can also execute software applications, such as games, web browsers, or social-networking applications. Client devices, for example, can include user equipment, smartphones, tablet computers, laptop computers, desktop computers, or smartwatches.

Example processes and embodiments can be conducted or performed by a computing system or client device through a mobile application and an associated graphical user interface ("UX" or "GUI"). In certain non-limiting embodiments, the computing system or client device can be, for example, a mobile computing system—such as a smartphone, tablet computer, or laptop computer. This mobile computing system can include functionality for determining its location, direction, or orientation, such as a GPS receiver, compass, gyroscope, or accelerometer. Such a device can also include functionality for wireless communication, such as BLUETOOTH communication, near-field communication (NFC), or infrared (IR) communication or communication with wireless local area networks (WLANs), 3G, 4G, LTE, LTE-A, 5G, Internet of Things, or cellular-telephone network. Such a device can also include one or more cameras, scanners, touchscreens, microphones, or speakers. Mobile computing systems can also execute software applications, such as games, web browsers, or social-networking applications. With social-networking applications, users can connect, communicate, and share information with other users in their social networks.

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

In one embodiment, the disclosure provides a computer-implemented method comprising: receiving a first labeled training data set comprising a first plurality of images, each image of the first plurality of images being associated with a set of labels; programmatically training a machine learning neural Teacher model on the first labeled training data set; programmatically applying a machine learning model trained for natural language processing to an unlabeled data set comprising digital electronic representations of natural language text summaries of a second plurality of images, thereby generating a second labeled training data set comprising the second plurality of images; using the machine learning neural Teacher model, programmatically generating, for each image of the second plurality of images, a corresponding set of soft pseudo labels; programmatically generating a set of derived labels for each image of the second labeled training data set using the soft pseudo labels; training one or more programmed machine learning neural Student models using the derived labels; receiving a target image; and applying an ensemble of one or more of the Student models to output one or more classifications of the target image.

One embodiment further comprises programmatically updating at least one of the one or more programmed machine learning neural Student models using Active Learning.

One embodiment further comprises applying noise at one or more machine learning model training steps.

In one embodiment, the target image is a radiographic image of an animal or a pet.

In one embodiment, each image of the first plurality of images and each image of the second plurality of images is a radiographic image of an animal or pet.

In one embodiment, the natural language text summaries are radiology reports.

In one embodiment, the target image is formatted as a Digital Imaging and Communications in Medicine ("DICOM") image.

One embodiment further comprises using an infrastructure pipeline comprising micro-services that are deployed using DOCKER containers.

In one embodiment, at least one of the machine learning neural Student models or the machine learning neural Teacher model is programmed to comprise an architecture that comprises at least one of the open source libraries known as and available at the time of this writing as DenseNet-121, ResNet-152, ShuffleNet2, ResNext101, GhostNet, EfficientNet-b5, SeNet-154, Se-ResNext-101, or Inception-v4.

In one embodiment, at least one of the machine learning neural Student models or the machine learning neural Teacher model is programmed as a convolutional neural network.

In one embodiment, one of the one or more classifications of the target image indicates one of healthy or abnormal tissue.

In one embodiment, one of the one or more classifications of the target image indicates abnormal tissue; and the indicated abnormal tissue is further classified as at least one of cardiovascular, pulmonary structure, mediastinal structure, pleural space, or extra thoracic.

In one embodiment, at least one of the one or more classifications of the target image is a subclassification.

One embodiment further comprises pre-preprocessing the target image, wherein said pre-processing comprises applying a trained machine learning filter model to the target image before outputting the one or more classifications of the target image.

One embodiment further comprises programmatically determining a correct anatomical orientation of the target image before outputting the one or more classifications of the target image.

In one embodiment, the determining the correct anatomical orientation of the target image comprises executing a trained machine learning model programmed to operate without relying on either DICOM metadata associated with the target image or a laterality marker associated with the target image.

In one embodiment, the trained machine learning model was jointly trained on augmented data and real data.

In one embodiment, the determining the correct anatomical orientation of the target image comprises determining a correct rotation of the target image by executing a first programmed model and determining a correct flip of the target image by executing a second programmed model.

One embodiment further comprises programmatically validating that the target image corresponds to a correct body part after determining the correct anatomical orientation of the target image and before outputting the one or more classifications of the target image.

In one embodiment, validating that the target image corresponds to the correct body part comprises executing a trained machine learning model.

In various embodiments, the disclosure provides one or more computer-readable non-transitory storage media operable when executed by one or more processors to perform one or more of the methods provided by this disclosure.

In various embodiments, the disclosure provides a system comprising: one or more processors; and one or more computer-readable non-transitory storage media coupled to one or more of the processors and comprising instructions operable when executed by one or more of the processors to cause the system to perform one or more of the methods provided by this disclosure.

2.0 Machine Learning Techniques for Processing Animal or Pet Radiology Images

In one embodiment, the disclosure provides automated techniques for classifying animal or pet radiographic images. One or more digitally stored radiographic images can be in Digital Imaging and Communications in Medicine ("DICOM") format. Once received, the images can be digitally filtered to remove certain features, such as non-thoracic images, using a trained machine learning model or tool, such as a convolutional neural network model or transformer-based model. In other examples, the machine learning model or tool can be a K-nearest neighbor (KNN), naïve Bayes (NB), decision trees or random forests, support vector machine (SVM), a deep learning model, such as CNN, region-based CNN (RCNN), one-dimensional (1-D) CNN, recurrent neural networks (RNNs), or any other machine learning model or technique. In other example embodiments, further filtering can be done to remove whole images or parts of images, such as the thorax, pelvis, abdomen, or body. The filtering can be performed based on DICOM body part tags and one or more view positions. A model that performs such filtering can be referred to as a "filter model."

The resultant machine learning model can be used for a variety of clinical or medical purposes. For example, a radiology image of a pet can be taken by a veterinarian or a veterinarian's assistant. That image can then be processed using a trained machine learning model. During processing, the image can be classified as normal or abnormal. If abnormal, the image can be classified as at least one of a cardiovascular, pulmonary structure, mediastinal structure, pleural space, or extra thoracic. In some non-limiting embodiments, the image can be subclassified. For example, subclasses of pleural space can include a pleural effusion, pneumothorax, and/or pleural mass. The image, which can be filtered, segmented, annotated, masked, or labelled, can then be displayed to the user with the determined class and subclass of the image using a display device such as a screen of the computing device.

In one embodiment, the machine learning process, and the resulting image, can be used to provide on demand second opinions for radiologists, form a basis of a service which provides veterinary hospitals with immediate assessment of radiologic images, and/or increase efficiency and productivity by allowing radiologists to focus on the pets themselves, rather than on the images.

In some non-limiting embodiments, the machine learning framework can include a convolutional neural network (CNN) component that is trained or has been trained from collected training data of radiographic images of animals or pets products and corresponding ground truth data (e.g., known or determined labels or annotations). The collected training data, for example, can include one or more images captured by a client device. A CNN is a type of artificial neural network comprising one or more convolutional and subsampling layers with one or more nodes. One or more layers, including one or more hidden layers, can be stacked to form a CNN architecture. Disclosed CNNs can learn to determine image parameters and subsequent classifications of radiographic images of animals or pets by being exposed to large volumes of labeled training data. While in some examples a neural network can train a learned weight for every input-output pair, CNNs can convolve trainable fixed-length kernels or filters along their inputs. CNNs, in other words, can learn to recognize small, primitive features (low levels) and combine them in complex ways (high levels). In particular embodiments, CNNs can be supervised, semi-supervised, or non-supervised.

In certain non-limiting embodiments, pooling, padding, and/or striding can be used to reduce the size of a CNN's output in the dimensions that the convolution is performed, thereby reducing computational cost and/or making over-training less likely. Striding can describe a size or number of steps with which a filter window slides, while padding can include filling in some areas of the data with zeros to buffer the data before or after striding. In one embodiment, pooling, for example, can include simplifying the information collected by a convolutional layer, or any other layer, and creating a condensed version of the information contained within the layers.

In some examples, a region-based CNN (RCNN) or a one-dimensional (1-D) CNN can be used. RCNN includes using a selective search to identify one or more regions of interest in an image and extracting CNN features from each region independently for classification. Types of RCNN employed in one or more embodiments can include Fast RCNN, Faster RCNN, or Mask RCNN. In other examples, a 1-D CNN can process fixed-length time series segments produced with sliding windows. Such 1-D CNN can run in a many-to-one configuration that utilizes pooling and striding to concatenate the output of the final CNN layer. A fully connected layer can then be used to produce a class prediction at one or more time steps.

As opposed to 1-D CNNs that convolve fixed-length kernels along an input signal, recurrent neural networks (RNNs) process each time step sequentially, so that an RNN layer's final output is a function of every preceding timestep. In certain embodiments, an RNN variant known as long short-term memory (LSTM) model can be used. LSTM can include a memory cell and/or one or more control gates to model time dependencies in long sequences. In some examples the LSTM model can be unidirectional, meaning that the model processes the time series in the order it was recorded or received. In another example, if the entire input sequence is available two parallel LSTM models can be evaluated in opposite directions, both forwards and backwards in time. The results of the two parallel LSTM models can be concatenated, forming a bidirectional LSTM (bi-LSTM) that can model temporal dependencies in both directions.

In some embodiments, one or more CNN models and one or more LSTM models can be combined. The combined model can include a stack of four unstrided CNN layers, which can be followed by two LSTM layers and a softmax classifier. A softmax classifier can normalize a probability distribution that includes a number of probabilities proportional to the exponentials of the input. The input signals to the CNNs, for example, are not padded, so that even though the layers are unstrided, each CNN layer shortens the time series by several samples. The LSTM layers are unidirectional, and so the softmax classification corresponding to the final LSTM output can be used in training and evaluation, as well as in reassembling the output time series from the sliding window segments. The combined model though can operate in a many-to-one configuration.

2.1 Example Pet Radiology Image for Classification

FIG. 1 illustrates a radiograph image before and after it has been processed by the one or more machine learning models or tools according to certain embodiments. In the example of FIG. 1, a before image 110 illustrates an X-ray image of a pet's heart. Accordingly, the before image 110 has not yet been processed by the one or more machine learning model(s) and/or tool(s). An after image 120 has been classified as cardiovascular, and subclassified or further classified as identified as Cardiomegaly. The classification is based on one or more features included in the before image 110. Specifically, the one or more features in the before image 110 used for classification can include the size and shape of the pet's heart and/or the relation of the heart to other body parts, such as the rib cage of the pet or another body part.

2.2 Labels for Pet Radiology Images

FIG. 2 illustrates examples of labels 220 that can be selected by a trained veterinary radiologist, or any other veterinary expert for application to an input image 210. The labels 220, for example, can include at least five different classes, and at least 33 different subclasses or further classes, the extent of which is constantly growing. A first classification can be cardiovascular. The subclasses associated with the cardiovascular classification can be Cardiomegaly, Vertbral Heart Score, Right Ventricular Enlargement, Left Ventricular Enlargement, Right Atrial Enlargement, Left Atrial Enlargement, Aortic Enlargement, Main Pulmonary Artery Enlargement. A second classification can be pulmonary structures. The subclasses associated with the pulmonary structures can include Interstitial Unstructured, Interstitial—Nodule, Alveolar, Bronchial, Vascular, Pulmonary Mass. A third classification can be mediastinal structures. The subclasses associated with the mediastinal structures can include Oesophagal Dilation, Tracheal Collapse, Tracheal Deviation, Lymphnode enlargement, Mass. A fourth classification can be pleural space, which can be associated the subclasses such as Pleural Effusion, Pneumothorax, Pleural Mass. A fifth classification can be extra thoracic, which can be associated with subclasses such as Spondylosis, Cervical trachea collapse/trachealis laxity, Degenerative joint disease, Gastric distention, Abdominal effusion/loss of detail, Intervertebral disc disease, Luxation/Sub Luxation, Aggressive lesion, Hepatomegaly, Foreign Material In Stomach, Mass/nodule/lipoma.

In particular, according to certain non-limiting embodiments, an inputted image 210 can be annotated and/or labelled 210. One example method of assigning labels can be using an automated, natural language processing ("NLP") model, which can input text into the body of the images from one or more associated radiology reports. In another example, trained veterinary radiologists can manually apply labels to all the extracted images.

In certain non-limiting embodiments, a machine learning model or tool can be trained using the annotated or labelled images. In other words, the determined classification can be based on the annotations or labels included in the image. This model can be trained using, for example, two discrete steps. In the first step, the machine learning model, such as a CNN, can be trained using the images labelled or annotating using the NLP model. In the second step, the trained machine learning model can be further trained using the extracted images labelled by the trained veterinary radiologists (i.e., experts). For purpose of example and not limitation, the architecture of the machine learning model or tool can be programmed or trained according to at least one of DenseNet-121, ResNet-152, ShuffleNet2, ResNext101, GhostNet, EfficientNet-b5, SeNet-154, Se-ResNext-101, Inception-v4, Visual transformer, SWIN transformer and/or any other known training tool or model.

2.3 Classifying Pet Radiology Images in One Embodiment

FIG. 3 illustrates an example method for using machine learning systems to classify and label images. In the example of FIG. 3, a method 300 can begin at a first step 310, where an image can be received or captured at a device. The image can include one or more features.

At a second step 320, the system can generate a corresponding classification for each of the one or more images, wherein the classification is generated by a machine-learning model, wherein the classification is associated with one or more features.

At a third step 330, the system can transmit the corresponding classification and the labelled features to a network.

At a fourth step 340 the system can display the corresponding classification on the client device or on another computing device on the network.

3.0 AdjustNet: Automated Techniques for the Orientation of Pet Radiology Images In one embodiment, the disclosure provides a method for automated determination of correct anatomical orientation in veterinary radiographs without relying on DICOM metadata or laterality markers. The disclosure also provides, among other things, deep learning model(s) for determining correct anatomical orientation in veterinary radiographs for clinical interpretation that do not rely on DICOM metadata or laterality markers and which can include novel real-time deployment capabilities for use in a large teleradiology practice. The disclosed subject matter can inform a variety of clinical imaging applications including quality control, patient safety, archive correction, and improving radiologist efficiency. In one embodiment, a model for automated determination of correct anatomical orientation in veterinary radiographs can be referred to as AdjustNet. In one embodiment, AdjustNet comprises two sub models. A first sub model comprises an ensemble of three trained machine learning neural models referred to as RotationNet for determining the correct rotation of a pet radiographic image. A second sub model comprises an ensemble of three trained machine learning neural models referred to as FlipNet for determining whether a pet radiographic image should be flipped. In one embodiment, AdjustNet, RotationNet, and FlipNet can be structured, trained, and used as detailed in the present section of this disclosure.

Radiographic imaging is important for diagnosis in innumerable important medical conditions. Accurate image orientation is critical for optimal clinical interpretation, yet errors in digital imaging metadata can lead to improper display, requiring manual intervention, and frustrates efforts toward maximizing clinical workflow quality and efficiency.

Moreover, there are several important workflow considerations in radiography that impact clinical interpretation by radiologists including exposure settings, processing technique(s), and anatomic orientation. These considerations are incorporated as textual metadata in the Digital Imaging and Communications in Medicine (DICOM) universal image file format to accompany the pixel data for viewing and radiology interpretation using DICOM-viewers. Despite the standardized DICOM imaging file conventions, inconsistencies in the metadata information, particularly regarding image orientation, is common and leads to practice workflow inefficiencies during the medical interpretation task. Manual image re-orientation is required before interpretation. In addition, most radiology practices perform radiographic imaging with a laterality marker that indicates the position of the patient, however, this practice is heterogeneous and error-prone, which can also lead to similar image orientation errors. Therefore, an automated solution for proper DICOM radiographic image orientation that does not rely upon accurate DICOM metadata or laterality markers could significantly improve radiologist workflow, reduce interpretation errors, contribute to quality improvement and education initiatives, and facilitate data science curation of retrospective medical imaging data.

In one embodiment, the disclosure provides various network architectures to achieve accurate automated radiographic image orientation detection. In one experiment, convolutional neural network architectures were developed with a data set of 50,000 annotated veterinary radiologic images to achieve accurate automated radiographic image orientation detection from 0, 90, 180, and 270 degrees, flipping horizontally and vertically across anatomic regions and clinical indications.

In one embodiment, a model can be trained for the task of correctly oriented images. The model can be a single model or a two-stage model. In non-limiting embodiments, multiple different weight initialization techniques can be used for developing models. For example, the transfer learning approach can be performed using model weights that have been pre-trained (e.g., on ImageNet), or models can be initialized randomly and then further pre-trained on augmented data. In non-limiting embodiments, various training pipelines can be used for developing models. For example, the model can be pre-trained with augmented data and fine-tuned with real data. The model can be also jointly trained with augmented and real data. In certain embodiments, the disclosed subject matter can be used for calculating the weighted sum of the feature maps of a convolutional layer of a trained neural network.

The following sections 3.1-3.4 of this disclosure describe, among other things, data curation, data annotation, data augmentation, training, and testing of AdjustNet and components thereof in various embodiments.

3.1 Input Data and Workflow

In one study approved by an ethics review board, a dataset of 50,000 examinations in DICOM format were obtained. The examinations were chosen randomly, and the distribution of examination quantities is listed in Table 1.

TABLE 1

Example Distribution of Examination Quantities.

|  | Training Set | Validation Set | (prop.) |
|---|---|---|---|
| Total Number of Dogs | 1472 | 330 | 0.95 |
| Thoracic studies | 574 | 130 | 0.39 |
| Abdomen studies | 530 | 120 | 0.36 |
| Skull and spine studies | 74 | 14 | 0.05 |
| Pelvis studies | 103 | 23 | 0.07 |
| Limb studies | 191 | 43 | 0.13 |
| Total Number of Cats | 78 | 20 | 0.05 |
| Thoracic studies | 32 | 9 | 0.40 |
| Abdomen studies | 30 | 7 | 0.40 |
| Skull and spine studies | 2 | 0 | 0.02 |
| Pelvis studies | 5 | 2 | 0.06 |
| Limb studies | 9 | 2 | 0.12 |
| Totals | 1550 | 250 | 1.0 |

Figure 5:
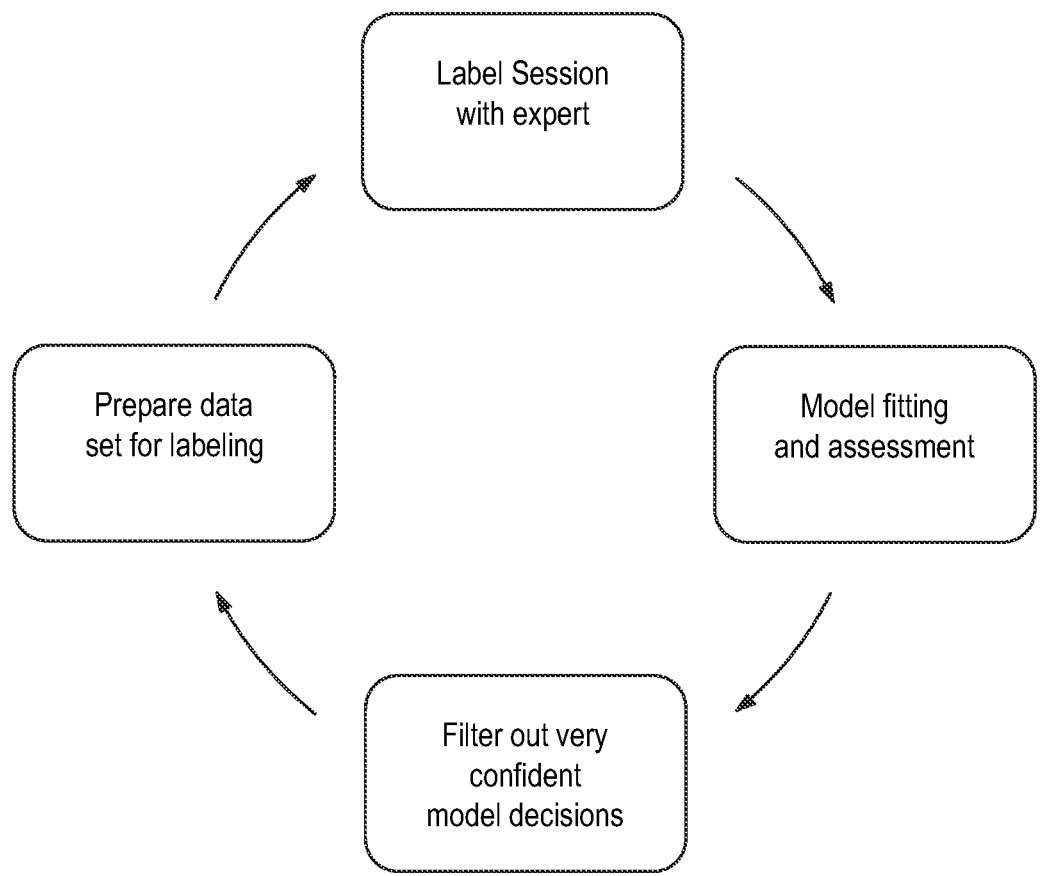
FIG. 5 illustrates an example workflow for an image orientation task.

FIG. 5 illustrates an example workflow for an image orientation task.

As depicted in FIG. 5, a board-certified veterinary radiologist with 14 years of experience annotated imaging examinations via an iterative labeling process. After human expert review of an initial dataset of 251 images, modeling was performed using the initial dataset (as further described herein concerning model training, after which the trained model was used to select new examinations for human review, concentrating on images that were incorrect based on the human expert review to provide more data for model training focused on difficult examinations. This process was repeated five times; in total 1550 images were annotated by the human expert. Due to dataset class imbalance, augmentation was performed via rotation and flipping correctly oriented images. Cropping was also performed as initial models were found, similar to prior studies, to rely upon the laterality marker location to determine orientation, which was unreliable in an analysis of the naive incorrectly oriented images in the dataset after expert human review, as further described in connection with FIG. 6.

Figure 6:
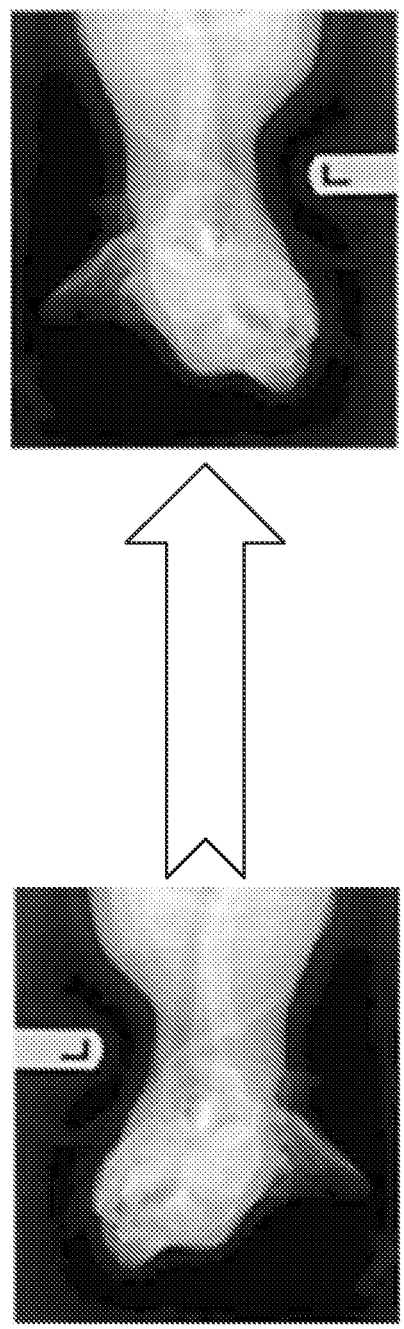
FIG. 6 illustrates radiograph images of an example of an incorrectly oriented image and an example of a correctly oriented image of a feline skull.

FIG. 6 illustrates radiograph images of an example of an incorrectly oriented image and an example of a correctly oriented image of a feline skull.

In particular, FIG. 6 shows an example of an incorrectly oriented image (left) and correctly oriented image (right) of a feline skull radiograph. A laterality marker is prominently featured in the image, which in this case was incorrectly applied.

3.2 Model Development

First, a single model was trained for the task of correctly orienting the image (both rotation and flipping). This multiclass model had 8 output neurons (0-No-Flip, 90-No-Flip, 180-No-Flip, 270-No-Flip, 0-Flip, 90-Flip, 180-Flip, 270-Flip). Table 2 shows a radiographic study count per label in the training, validation, and test sets.

TABLE 2

Radiographic study count per label in the training, validation, and test sets.

|  | 0-rotation | 0-rotation & flip | 90-rotation | 90-rotation & flip | 180-rotation | vertical flip | 270-rotation | 270-rotation and vertical flip |
|---|---|---|---|---|---|---|---|---|
| Train Real | 1301 | 36 | 33 | 16 | 59 | 37 | 45 | 23 |
| Train Augmented | — | 1301 | 1301 | 1301 | 1301 | 1301 | 1301 | 1301 |
| Val Real | 256 | 12 | 17 | 4 | 19 | 16 | 18 | 8 |
| Val Augmented | — | 256 | 256 | 256 | 256 | 256 | 256 | 256 |
| Test Real (Balanced) | 12 | 12 | 12 | 12 | 12 | 12 | 12 | 12 |
| Test Real | 1400 | 22 | 27 | 19 | 29 | 25 | 19 | 14 |

All DICOM images were converted first to JPEG2000 format in high resolution then to PNG with a larger size of 512 pixels. Images were resized to 256×256 pixels, and then center cropped to minimize laterality markers in the image, as further described herein concerning data augmentation, by using Image cropping of 0.8 and random zoom (100%-120%). The training set had 1550 images; the validation set had 350 images (plus augmentations).

Figure 7:
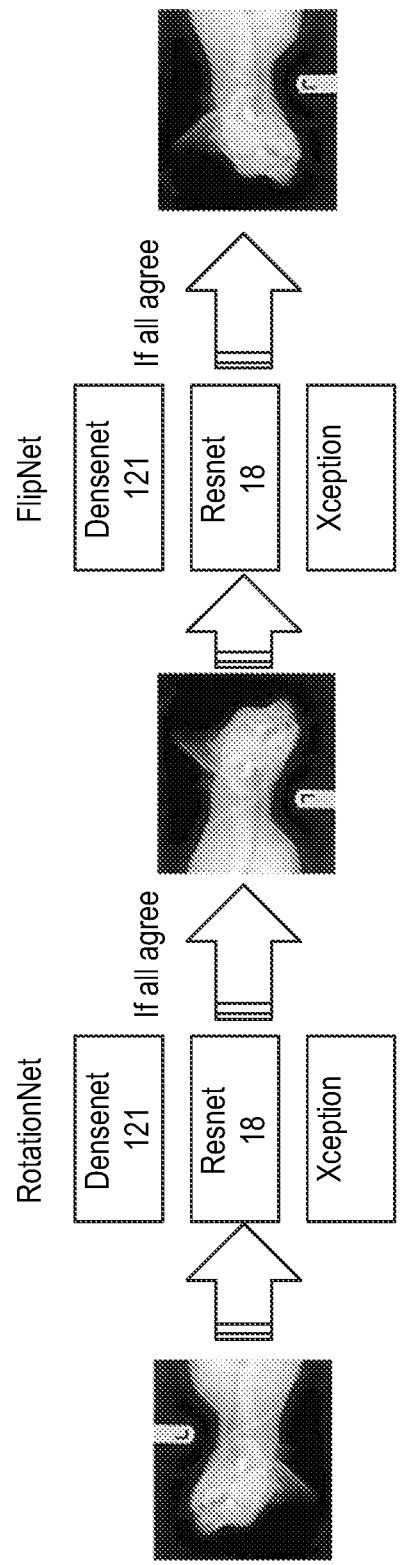
FIG. 7 illustrates a diagram of an example two stage model technique with an ensemble according to certain non-limiting embodiments.

Next, a two-stage stepwise approach was used to automate reorienting the image by training one model for correctly rotating the image and then a second for correctly flipping the image (see FIG. 7).

FIG. 7 illustrates a diagram of an example two stage model technique with an ensemble according to certain non-limiting embodiments.

In particular, FIG. 7 shows an example two-stage model approach with an ensemble for each task (rotation followed by flipping). Each step consisted of three different model architectures trained for the given task, and heuristics in practice required that all three models agree before performing a given re-orientation of the image. For the Rotation Network (RotationNet) and the Flip Network (FlipNet), different CNN architectures (ResNet, Xception, and DenseNet121) were trained and their performance compared. Two different weight initialization techniques were used: (1) a transfer learning approach was performed using model weights pre trained on ImageNet, and (2) the models were initialized randomly and then further pre-trained on augmented data. Two different training pipelines were also used: (1) the models were pre-trained with augmented data and then fine-tuned with real data, and (2) the models were jointly trained with augmented and real data. In one embodiment, the randomly initialized models which were jointly trained on augmented data and real data were dominating other approaches in terms of accuracy in multiple iterations of the disclosed data collection process. As such, this approach was used to train the final models in one embodiment.

In one embodiment, Grad-CAM was used by calculating the weighted sum of the feature maps of the last convolutional layer of the trained neural networks. Weights were determined by normalizing sums of gradients of class labels with respect to weights of feature maps. Those weighted sums were re-sized to the image size of the input image, transformed into a RGB image, and then overlayed on the original input image (see FIG. 8).

Figure 8:
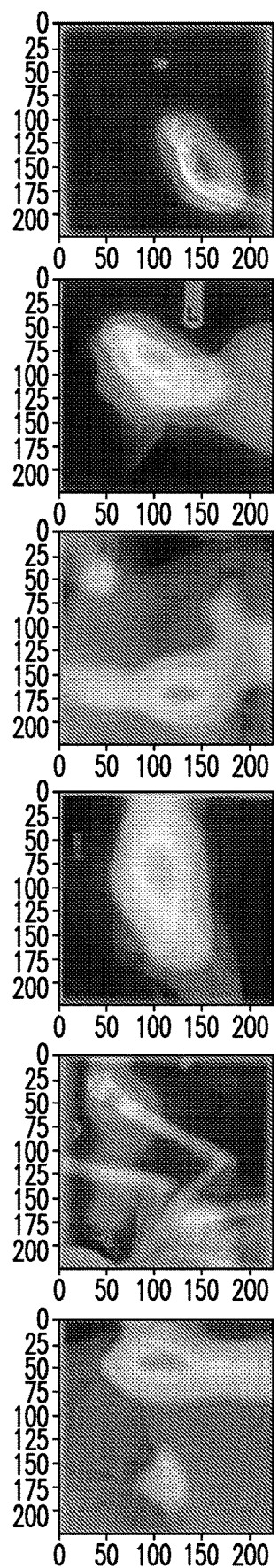
FIG. 8 illustrates example images of GradCAM transformation used for the model decision regarding image orientation.

FIG. 8 illustrates example images of GradCAM transformation used for the model decision regarding image orientation.

As depicted in FIG. 8, in one embodiment, the resulting images were used to critique the model and inform the augmentation process. FIG. 8 shows GradCAM transformations indicating the pixels in the image used for the model decision regarding image orientation. Importantly, the laterality marker is not included in the pixels in one embodiment. Encouragingly, the number of studies requiring manual transformations with the model was 50% less than without the model in deployment.

All models were trained on two Tesla V100 graphical processing units (GPUs). The models were designed to minimize cross-entropy-loss, used the Adam optimizer with default parameters and a learning rate of $1 \times 10^{-3}$, reducing the learning rate by a factor of 0.1 if the model did not increase the validation accuracy for about two epochs. Because only 10% of total images are incorrectly oriented, high precision was required to be useful in a production setting. Hence, an ensemble strategy, in which three networks have to unanimously agree on the rotation or the flipping, was utilized.

3.3 Model Deployment

In one embodiment, a two-step model can be deployed centrally using a micro-service hosted within a DOCKER container and callable via a ReSTful API, thus allowing the model to be permanently resident in memory for optimal inference speed. The outputs of the model can then be used as an input for additional AI models deployed within an overall AI pipeline. Each image along with its model's prediction can be finally archived in a central repository (see FIG. 9).

Figure 9:
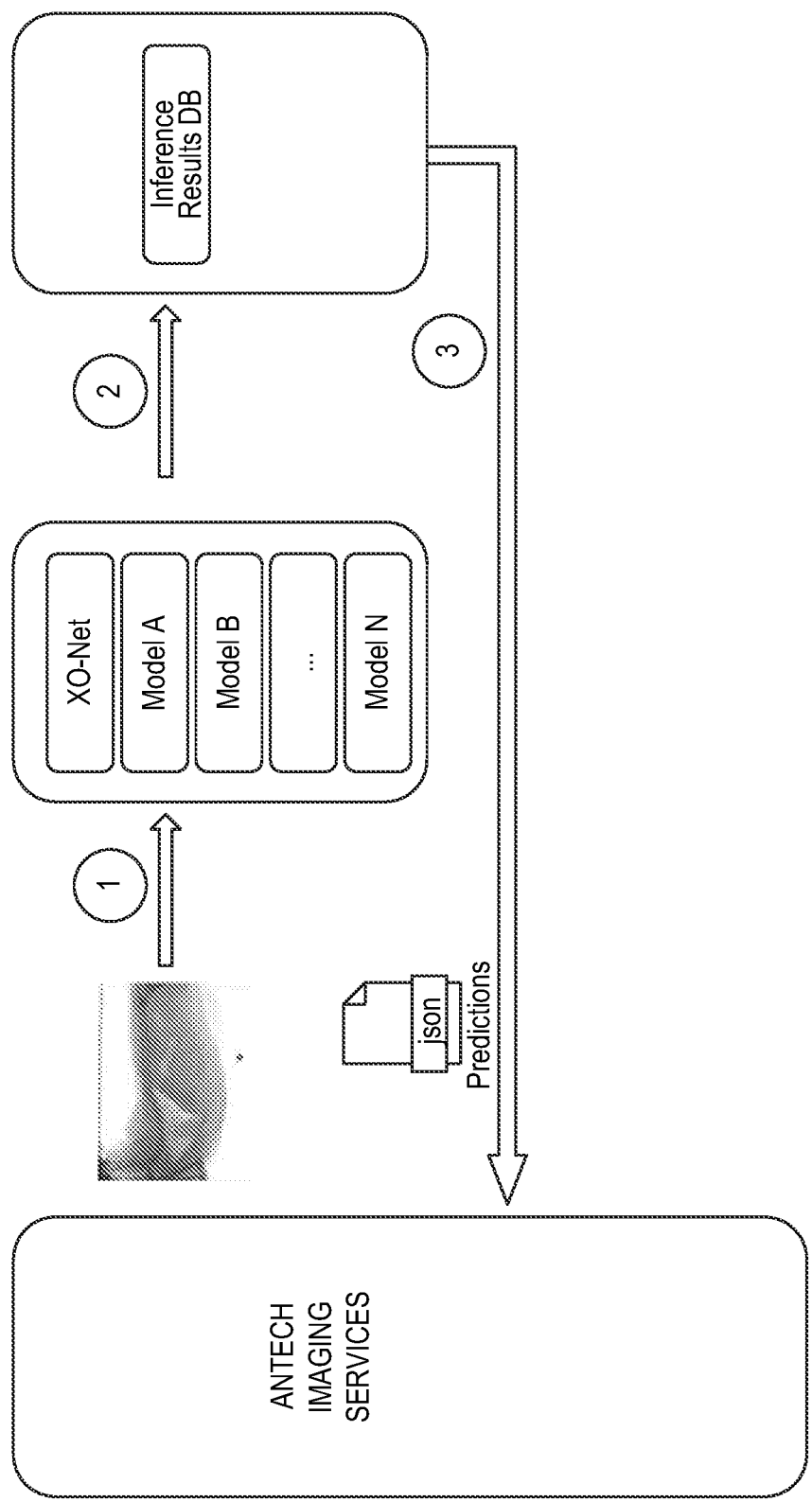
FIG. 9 illustrates a diagram of an example model deployment workflow.

FIG. 9 illustrates a diagram of an example model deployment workflow.

In one study, in order to quantify the impact of the model post-production for real-time prospective impact, the production model was removed from the workflow for a 24 hour period, and web user interface (UI) logs were used to capture instances where the consulting radiologist was required to perform manual transformations, such as rotation and/or flipping, of radiograph(s) during study interpretation. Data from the whole study period were summarized in overlapping, 24-hour batches, using a sliding window which was shifted by three hours until reaching the end of the study. The metric of interest was the fraction of studies with one or more manual transformations. The red section of FIG. 9 shows the period during which the model was switched off, the lag in increase of manual transformations is due to the lag time between studies being received into the systems and the radiologists evaluating the study images.

3.4 User Feedback

In one study, a post-deployment radiologist user survey was developed to determine experience with the automated RotationNet by interpreting radiologists. Four questions were asked with Likert scale response options: (1) How did the implementation of the automated radiograph orientation model (RotationNet) impact your clinical work efficiency, (2) Would you recommend using RotationNet in your ongoing clinical workflow? (3) Are there any circumstances in which RotationNet should not be used clinically? and (4) Any comments/concerns please complete. The survey was sent to 79 radiologists representing a mix of teleradiologists, hybrid academic-teleradiologists, hybrid private clinicians-teleradiologists, 20.2% completing the survey. With regard to the impact on clinical work efficiency, 88% of respondents ranked the impact on clinical work efficiency a 4 or 5 ('better' or 'much better'). Two respondents ranked the impact on clinical work efficiency as 3-not worse or better. No respondents felt the impact of RotationNet on clinical work efficiency was worse. Ninety-four percent of respondents said they would recommend using RotationNet in their ongoing clinical workflow; only one was not sure. None of the respondents said that they would not recommend RotationNet. When asked if there were circumstances in which RotationNet should not be used clinically, 69% said 'no' while the remaining were unsure. Unsure responses overall were attributed to a lack of individual knowledge of machine learning. The open-ended comments (question four of the survey) were largely (80% of those leaving a comment) geared toward the increased sensitivity of the radiologist when RotationNet failed to properly rotate an image or when it was offline for scheduled maintenance or upgrade. One respondent commented on looking forward to cross-sectional imaging being right for their individual preference. The remaining respondents commented by reiterating an earlier answer or general positive comments about their work environment.

Table 3A and Table 3B show the accuracy of different modeling approaches. Accuracy (top) and errors (bottom) for models for the given task. Note that the ensemble model for both rotation (row) and flipping (column) tasks achieved the highest performance.

TABLE 3A

Accuracy for different approaches.

| | Densenet | Resnet | Xception | Ensemble |
|---|---|---|---|---|
| Densenet | 0.96 | 0.97 | 0.95 | 0.97 |
| Resnet | 0.96 | 0.96 | 0.96 | 0.97 |

TABLE 3A-continued

Accuracy for different approaches.

|  | Densenet | Resnet | Xception | Ensemble |
|---|---|---|---|---|
| Xception | 0.96 | 0.96 | 0.95 | 0.97 |
| Ensemble | 0.98 | 0.98 | 0.97 | 0.99 |

TABLE 3B

Accuracy for different modeling approaches (balanced data).

|  | Densent | Resnet | Xception | ENSEMBLE |
|---|---|---|---|---|
| Densenet | 0.92 | 0.91 | 0.9 | 0.91 |
| Resnet | 0.91 | 0.91 | 0.91 | 0.91 |
| Xception | 0.92 | 0.9 | 0.9 | 0.92 |
| Ensemble | 0.91 | 0.9 | 0.92 | 0.91 |

It can be common for radiologists to spend both time and cognitive effort manipulating images prior to interpretation in order to properly orient them. In radiography, this includes first determining whether the orientation is correct or not, then toggling, flipping, and rotation multiple times within and between images. For an individual study, this effort is not significant, but in aggregate, within a busy practice with many radiologists, beyond inconvenience, this inefficiency in manually adjusting improperly oriented images can contribute to errors, delayed care, and physician burnout. The purpose of one study was to explore the development of deep learning model(s) for determining correct anatomical orientation in veterinary radiographs for clinical interpretation and describe novel real-time deployment experience in a large teleradiology practice. The study found that data augmentation techniques significantly improved all model(s), with the ensemble of three models (RotationNet) achieving the highest performance (error rate<0.01), outperforming reported state-of-the-art in related work. Further, successful deployment of RotationNet in a live production environment processing 300,000 incoming DICOM files in a month for over 4,600 hospitals across 24+ countries reduced by 50% the number of studies that had a need for manual intervention by clinical radiologists. Automated medical imaging DICOM orientation using RotationNet in practice achieved state-of-the-art or better performance-optimizing clinical imaging interpretation workflow in production at scale.

Figure 10:
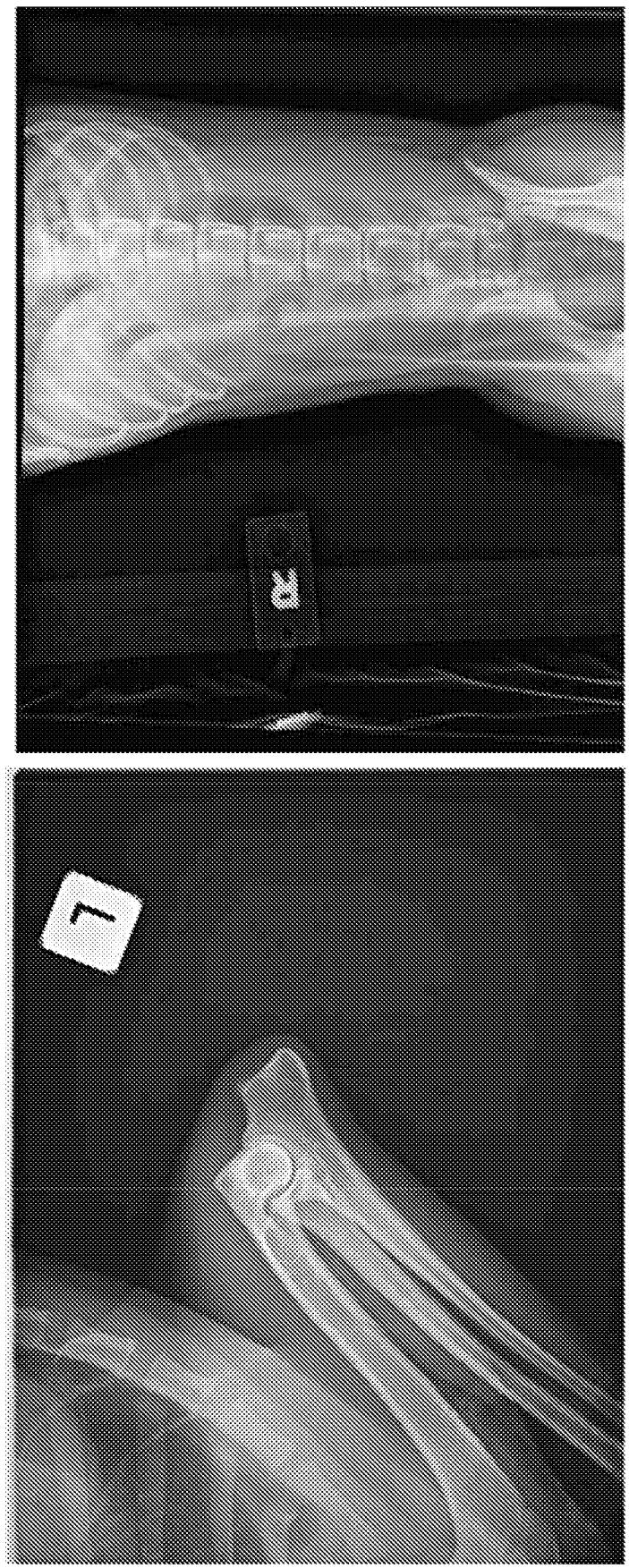
FIG. 10 illustrates example images used for error analysis according to certain non-limiting embodiments.

FIG. 10 illustrates example images used for error analysis according to certain non-limiting embodiments.

Error analysis was performed for false positives and negatives; examples of errors are shown in FIG. 10. In particular, FIG. 10 shows example error analysis images for the AdjustNet model. FIG. 10 depicts a radiograph of canine forearm (left, labeled "L") in which the model incorrectly predicted that the image required rotation by 90 degrees, but it was correctly oriented in original state. FIG. 10 also depicts a radiograph of the canine (right, labeled "R") in which the model incorrectly predicted that the image required flipping by 180 degrees, but it was correctly oriented in its original state.

In one embodiment, RotationNet can be used to retrospectively encode a large number of exams without DICOM or laterality data automatically and can be effective for other tasks as well, such as feedback to clinics regarding incorrect orientation, errors in DICOM metadata, or incorrect laterality markers. In one embodiment, RotationNet can be applied at the point-of-care as feedback to the radiographer for immediate and consistent feedback applications rather than after submission for interpretation holds the potential to improve awareness and baseline functioning for reducing errors (for example, flagging errors).

4.0 End-to-End Pet Radiology Image Processing using RapidReadNet

In one embodiment, the disclosure provides a machine learning neural model referred to as RapidReadNet. In one embodiment, RapidReadNet can be programmed as a multilabel classifier associated to 41 findings corresponding to various pathologies detectable in pet or animal radiographic images. In one embodiment, RapidReadNet can be structured, trained, and used as detailed in the present section of this disclosure.

4.1 Image Data Sets for Training RapidReadNet in One Embodiment

It can be beneficial to train programmed learning neural models using large set of images as training data sets. In various embodiments, unlabeled training data can be labeled by human subject matter experts and/or by existing machine learning models to generate one or more labeled training data sets.

Figure 11:
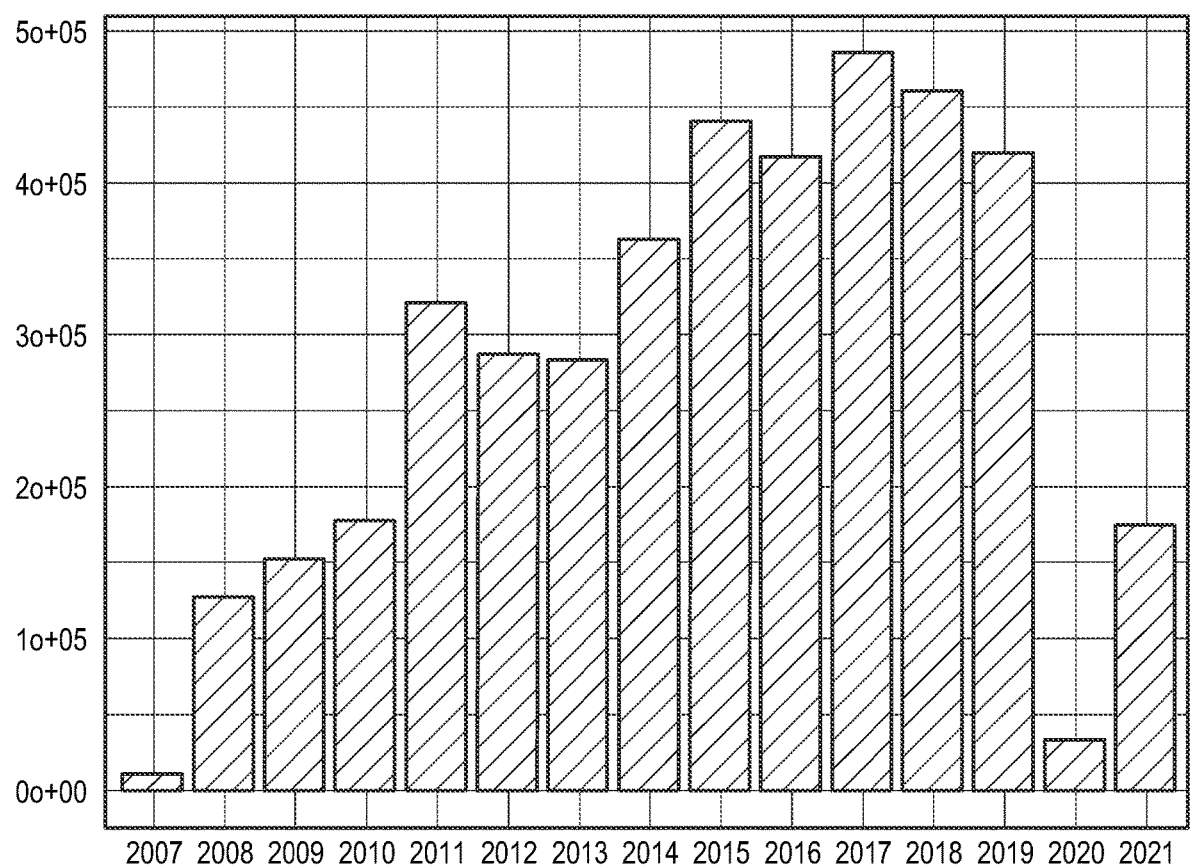
FIG. 11 illustrates a pool of images evaluated for modeling, in one embodiment.

FIG. 11 illustrates a pool of images evaluated for modeling, in one embodiment. In this example, a pool was evaluated which included over 3.9 million veterinary radiographs from the years 2007 through 2021. In various embodiments, images can be downsampled or otherwise pre-processed before being used as training data sets. In the study depicted in FIG. 11, a majority of the 3.9 million radiographs had previously been archived as lossy (quality 89) JPEG images, downsampled to a fixed width of 1024 pixels (px) ('set 1' in Table 4 below). Of the remaining radiographs, most were provided as (lossless) PNG images that were downsampled so that the smaller dimension (width or height) was 1024 px ('set 2' in Table 4).

TABLE 4

Summary of x-ray image data.

|  | set 1 | set 2 | silver | (total) |
|---|---|---|---|---|
| no. of images before filtering | 3318579 | 455077 | 186563 | 3960219 |
| no. of images after filtering | 2202007 | 344050 | 186563 | 2732620 |
| (% filtered out) | 0.336461 | 0.243974 | 0 | 0.309983 |
| image format(s) | JPEG | PNG | PNG |  |
| range of image widths | 1024 | [102-40345] | [71-2516] |  |
| range of image heights | [258-3068] | [1024-35328] | 512 |  |

Figure 12:
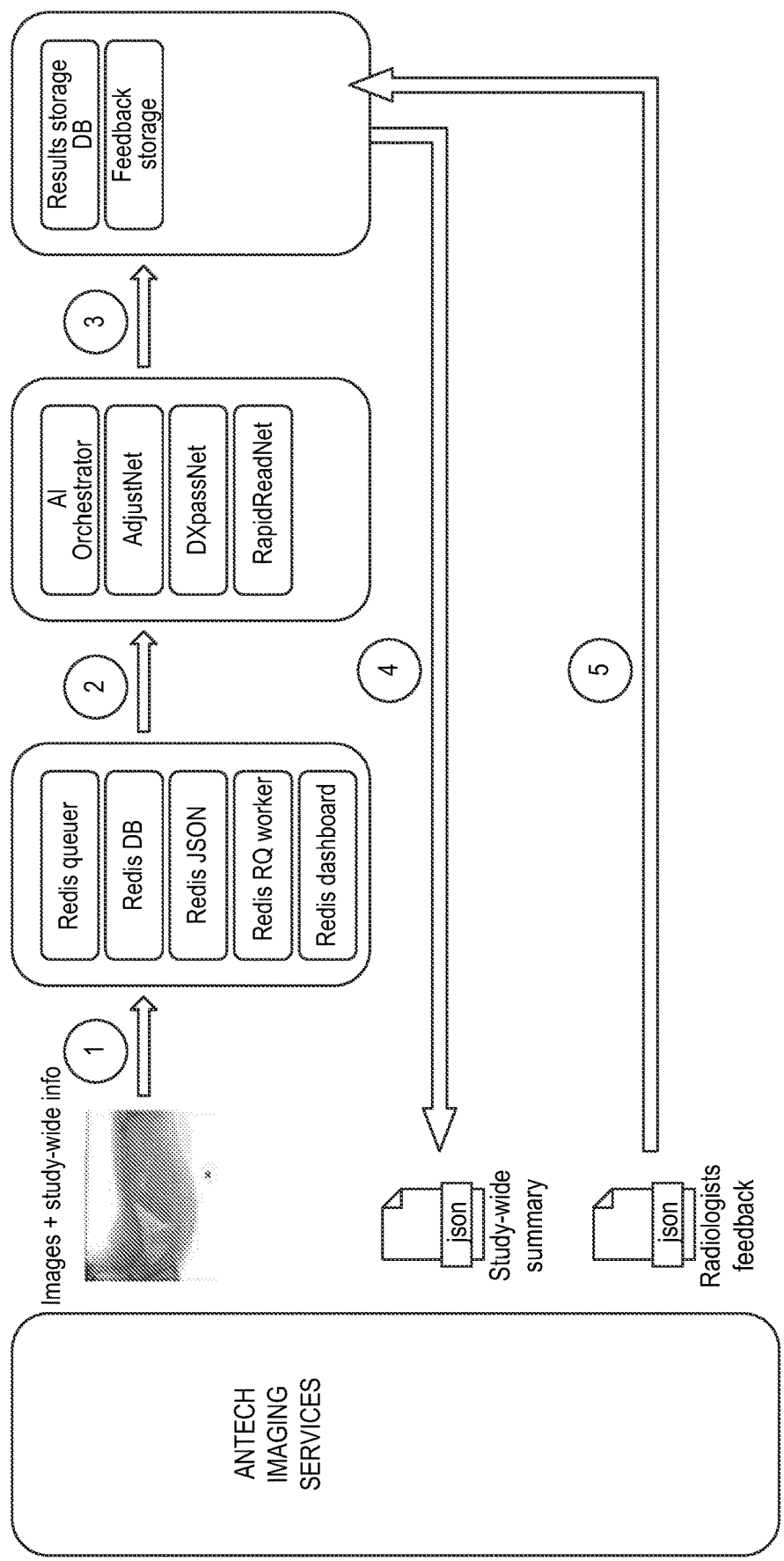
FIG. 12 illustrates the infrastructure of an X-Ray system of one embodiment, wherein images can be collected as part of a clinical workflow.

FIG. 12 illustrates the infrastructure of an X-Ray system of one embodiment, wherein images can be collected as part of a clinical workflow. The final subset of images was collected as part of a current clinical workflow (FIG. 12), where DICOM images submitted were downsampled to a fixed height of 512 px, then converted to PNG ('silver' in Table 4). In all cases, the downsampling process preserved original aspect ratios. In this example, all images were provided along with a subset of the original DICOM tags as metadata. In this example, all images/studies cover real clinical cases from various client hospitals and clinics (N>3500) received within the 14-year period as shown in FIG. 11.

In particular embodiments, a number of filtering steps can be applied prior to modeling. In this example, first, duplicated and low-complexity images were removed using imagemagick. In this example, second, imaging artefacts, and irrelevant views or body parts were filtered out using a CNN model trained for this purpose. Studies with more than 10 images were also excluded. Of the 3.9 million veterinary radiographs, approximately 2.7 million images were left after filtering, representing over 725,000 distinct patients.

In particular embodiments, the next step in modeling can include annotation and labeling. In this example, images were annotated for the presence of 41 different radiological observations (see Table 5, below).

TABLE 5

Radiological Labels.

| Anatomical Grouping | Observation |
| --- | --- |
| Cardiovascular | Cardiomegaly |
|  | Left Atrial Enlargement |
|  | Left Ventricular Enlargement |
|  | Right Ventricular Ealargement |
|  | Right Atrial Enlargement |
|  | Main Pulmonary Artery Enlargement |
|  | Aortic Abnormality |
|  | Heart Base Mass Effect |
|  | Microcardia |
| Pulmonary Structures | Bronchial pattern |
|  | Interstitial Unstructured |
|  | Pulmonary Alveolar |
|  | Pulmonary Interstitial-Nodule (Under 1 cm) |
|  | Pulmonary Vascular |
|  | Pulmonary Mass (Over 1 cm) |
| Pleural Space | Sign(s) of Pleural Ellusion |
|  | Pleural Mass Effect |
|  | Pneumothorax |
|  | Thin Pleural Fissure Lines |
| Mediastinal Structure | Esophagal Dilation |
|  | Intrathoracic Tracheal Narrowing |
|  | Tracheal Deviation |
|  | Mediastinal Mass |
|  | Mediastinal Widening |
|  | Mediastinal Lymph Node Ealargement |
| Extra Thoracic | Spondylois |
|  | Liver Abnormality |
|  | Abdominal mass |
|  | Intervertebral Disc Disease |
|  | Gastric Foreign Material |
|  | Cervical Tracheal Narrowing or Opacity |
|  | Degenerative Joint Disease |
|  | Decreased serosal detail |
|  | Gastric Distention |
|  | Aggressive Bone Lesion |
|  | Fracture and/or Luxation |
|  | Splenomegaly |
|  | Gastric Dilatation Volvalues |
|  | Subcutaneous Nodule |
|  | Subcutaneous Maes |
|  | Fat Opacity Mass (e.g. lipoma) |

In this example, for the majority of images (pre-2020 studies), labels were extracted from corresponding (study-wise) radiological reports using an automated, natural language processing (NLP)-based algorithm. In embodiments, labels can be extracted from radiological reports using another method. In embodiments, this initial labeled training data can be generated without using any machine learning model, for example, by using human experts. In this example, the radiology reports summarized all the images in a particular study and were written by over 2000 different board-certified veterinary radiologists. In this example, images from the most recent studies (years 2020-2021; 'silver' in Table 4) were individually labeled by a veterinary radiologist, immediately after they finished evaluating the study.

Various methods can be used to assess a trained model's accuracy and inter-annotator variability. In this example, a small number of images (N=615) were randomly selected from the 'silver' set to be labeled by 12 additional radiologists. These data were not used in training or validation. One way to produce ground truth labels for ROC and PR analyses is to aggregate the labels for each image by a majority-rules vote. In this example, if a majority of the 12 radiologists indicated a finding was present, then the finding was used as a ground truth label. Point estimates of the False Positive Rate (FPR) and Sensitivity for a particular radiologist were calculated by comparing their labels to the majority-rules vote of the 11 others.

In this example, automated extraction of labels from the "Findings" section of radiology reports was done using a modified version of a rules-based labeling software known in the art. However, the number of labels was extended to 41, as shown in Table 5.

In this example, although the reports contained observations from all images in a study, they never explicitly linked these observations with specific image files. Therefore, in this example, the per-study labels extracted from a report were initially applied to all images in the corresponding study, and then masked using a set of expert-provided rules. Using rules in this manner can ensure that labels are only applied to images that show the corresponding body parts (for example, 'Cardiomegaly' labels can be removed from images of the pelvis). Details about masking is discussed with more specificity herein.

In this example, the data sets of individually labeled data $(x_1, y_1), \ldots, (x_n, y_n)$ were used along with data labeled by a labeler adapted to veterinary radiology reports $(\tilde{x}_1, \tilde{y}_1), \ldots, (\tilde{x}_m, \tilde{y}_m)$. In embodiments, each finding $\tilde{y}_i$ can be entered as either 0 (negative), 1 (positive) or u (uncertain) and can be determined on the level of the radiology report instead on the level of the individual image. Hence, label noise can be present on a data set.

4.2 Neural Model Training Techniques for an Image Classification Task

In one embodiment, an image data set annotated by one or more human subject matter experts and a potentially larger data set annotated using a trained natural language processing (NLP) model can be combined by a distillation approach adapted to the multi-label use case. In one embodiment, a Teacher model $\theta^t_*$ can be first trained with the human-annotated data set and noise can be added to the training process:

$$\frac{1}{n}\sum_{i=1}^{n} l(y_i, f^{noise}(x_i, \theta^t))$$

Afterwards, a Teacher model can be used to infer soft pseudo labels for the images $\tilde{x}_1, \ldots \tilde{x}_m$. In the inference step, noise can not be used:

$\hat{y}_i = f(x_i, \theta^t_*), \forall i \in (1, \ldots, m))$

In one embodiment, the soft pseudo labels can be combined with the NLP derived labels using the rule:

$$\bar{y}_i = \begin{cases} \lambda \hat{y}_i + (1-\lambda)0.5 & \text{if } \tilde{y} = u \\ \lambda \hat{y}_i + (1-\lambda)\tilde{y}_i & \text{otherwise} \end{cases}, \forall i \in (1, \ldots, m)$$

In one embodiment, one or more Student models can be trained using the derived labels. For example, an equal-or-larger Student model $\theta^S_*$ can be trained with noise added to the Student:

$$\frac{1}{n}\sum_{i=1}^{n} l(y_i, f^{noise}(x_i, \theta^s)) + \frac{1}{m}\sum_{i=1}^{m} l(\tilde{y}_i, f^{noise}(\tilde{x}_i, \theta^s))$$

Notably, in some embodiments, the soft pseudo labels might not be combined with the NLP generated labels.

In one embodiment, an Active Learning process can be used to update one or more of the Student models as new training data is streamed into a system or otherwise obtained. In one embodiment, one of the Student models (or an ensemble of the Student models) can be programmed to act as new Teacher and the process can be redone without the first step. In one embodiment, said Active Learning process can be programmatically triggered to occur whenever a significant amount of new labeled data is received by a system.

In particular embodiments, the Student and Teacher models can be programmed according to a variety of different artificial neural network architectures. For each model, the number of images that fit into memory to determine batch-size can be maximized. In this example, this led to batch-sizes between 32 and 256. In this example, different image-input-sizes (ranging from 224×224 to 456×456) were used and both were trained with reshaping of the original images to the input dimension as well as zero-padding the image to a square and then resizing to keep the ratios of the original image intact. A multitude of image augmentation techniques can be performed when training. In this example, the models were pre-trained and were trained for a maximum of 30 epochs with early stopping if the validation loss did not decrease two epochs in a row.

In one embodiment, in order to calibrate the probability for each finding, one can apply the piecewise linear transformation $$t_{\phi, opt_\phi}(x) = \begin{cases} \dfrac{x}{2 \cdot opt_t}, & \text{if } x \leq opt_\phi \\ 1 - \dfrac{1-x}{2 \cdot (1-opt_f)}, & \text{else} \end{cases}$$

for all findings φ. One can set optφ to optimize Youden's J Statistic on an independent validation set.

In one embodiment, a final trained machine learning model used to classify a target radiology image, such as an animal and/or pet radiology image, can be an ensemble of individual, calibrated deep neural network Student models. In an embodiment, averaging outputs can lead to better results than voting by. In this example, the 8 best models were used based on the validation set and then the best subset method was used to determine the optimal ensemble. Surprisingly, the best subset was the full set of 8 models, in other words, including models that were under-performing against the rest of the ensemble. In this example, these underperforming models still helped the overall predictions when included in the ensemble of Student models. The final model comprising an ensemble of individual, calibrated deep neural networks can be referred to as RapidReadNet.

4.3 Drift Analysis, Experimental Results, and Longitudinal Drift Analysis

To assess the need to compensate for differences of the images obtained outside of one example and for use in the industry, a drift analysis can be performed. For example, at the time of development of a system, the images $X_1, \ldots X_n$ and findings per image $Y_1, \ldots Y_n$ can be viewed as draws from a joint distribution $P_{dev}(X, Y)$. In a real world application, images and findings can be presented from a distribution $P_{prod}(X, Y)$. In veterinary radiology at the scale of this example, multiple potential factors might lead to a difference between these distributions, including changes in breeds, different radiology equipment, or differences in clinical practice in different regions. The covariate shift, in other words, a change in the marginal distribution $$P_{dev}(Y|X) = P_{prod}(Y|X)$$

$$P_{dev}(X) \neq P_{prod}(X)$$

can be investigated and its influence on model performance can be analyzed. To detect covariate shift, an autoencoder can be trained using the Alibi-Detect software. In one embodiment, the autoencoder $f_A(\cdot, \Theta)$ can be trained at dev-time to minimize $\int (X - f_A(X|\Theta))^2 dP_{dev}$ with regards to $\Theta$. The trained autoencoder can then be used to reconstruct images at production time and analyze the reconstruction errors.

Figure 13A:
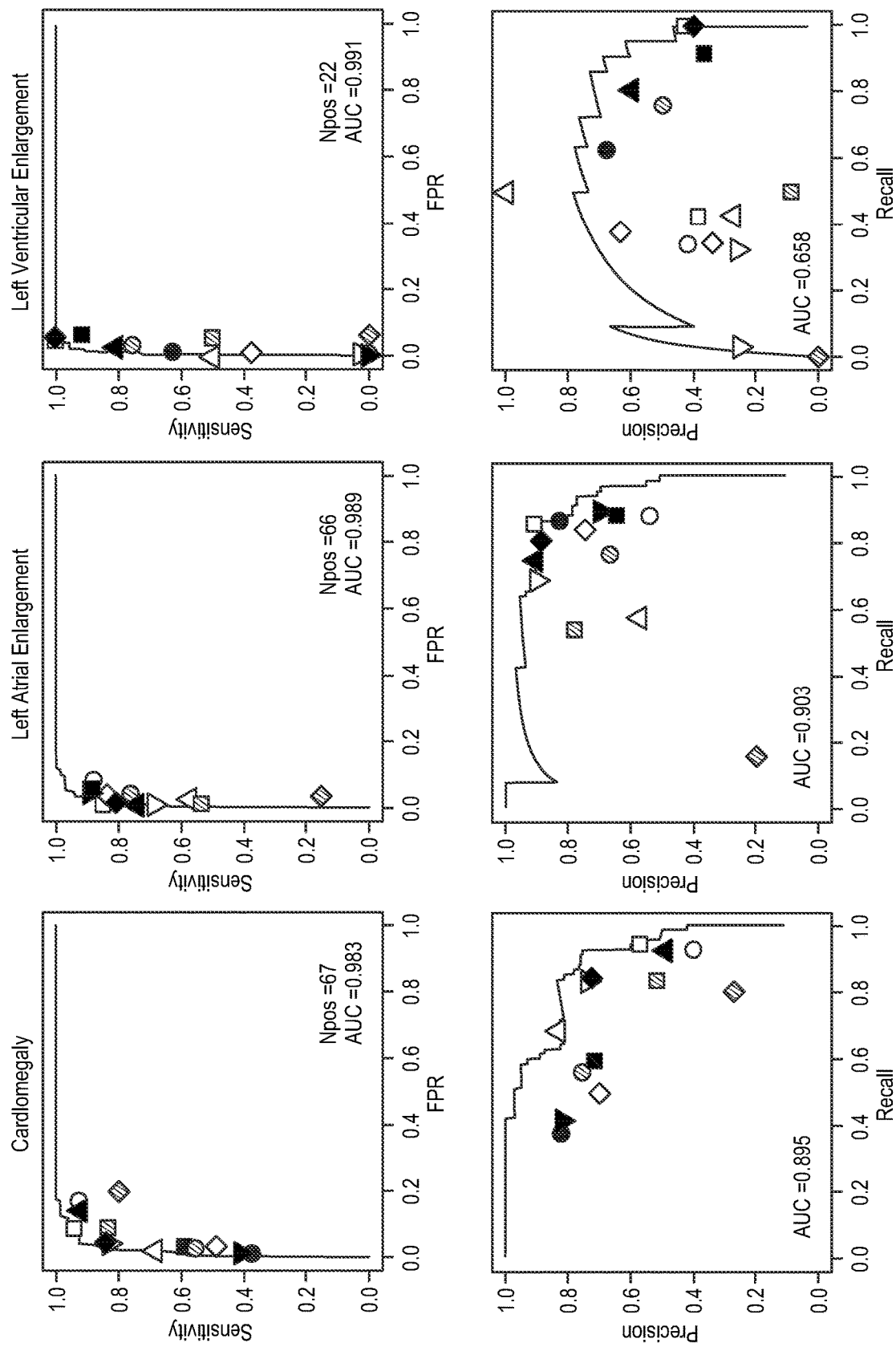
FIG. 13A illustrates a first set of ROC and PR curves for Cardiovascular and Pleural Space findings.
Figure 13B:
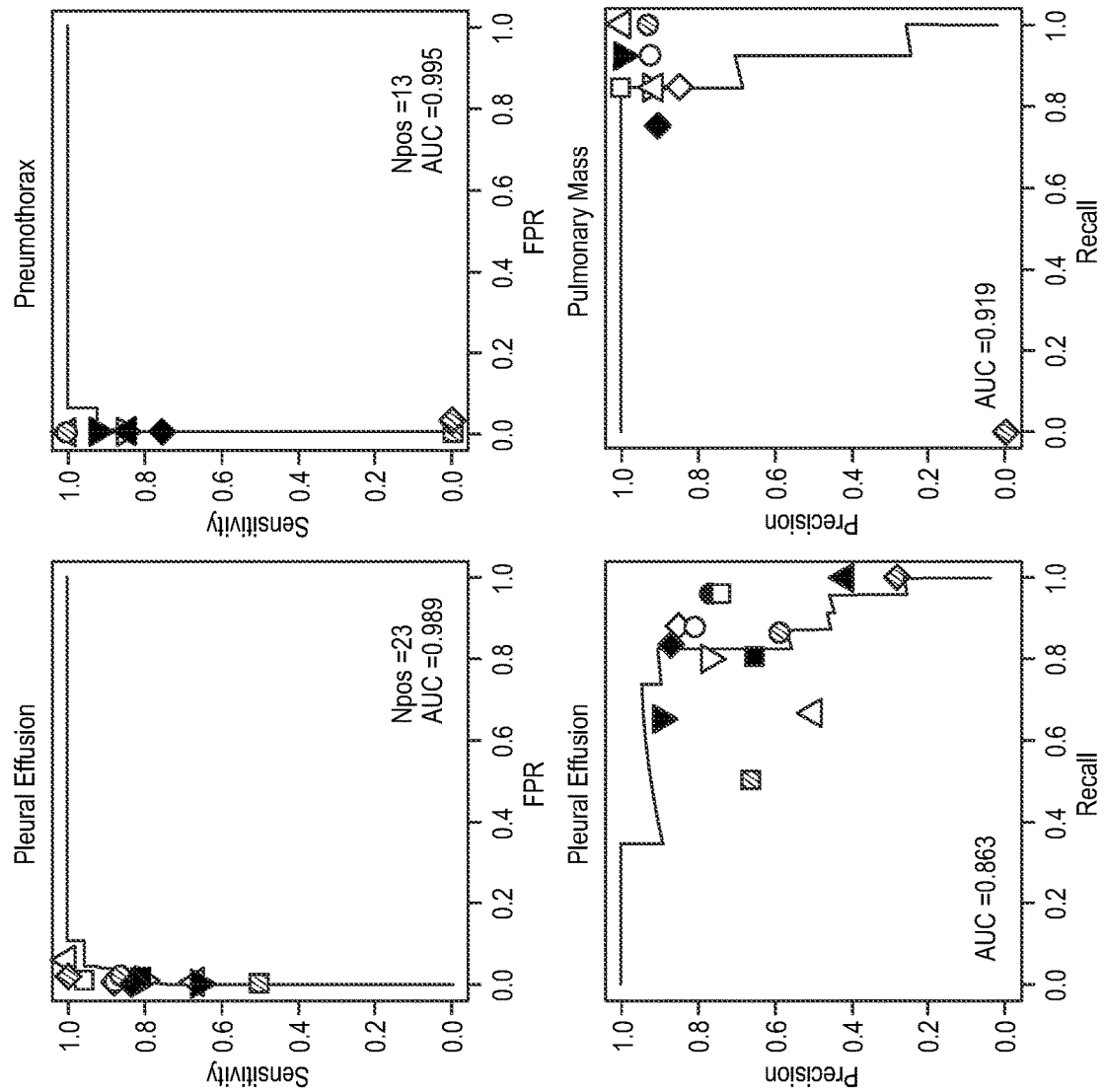
FIG. 13B illustrates a second set of ROC and PR curves for Cardiovascular and Pleural Space findings.
Figure 14A:
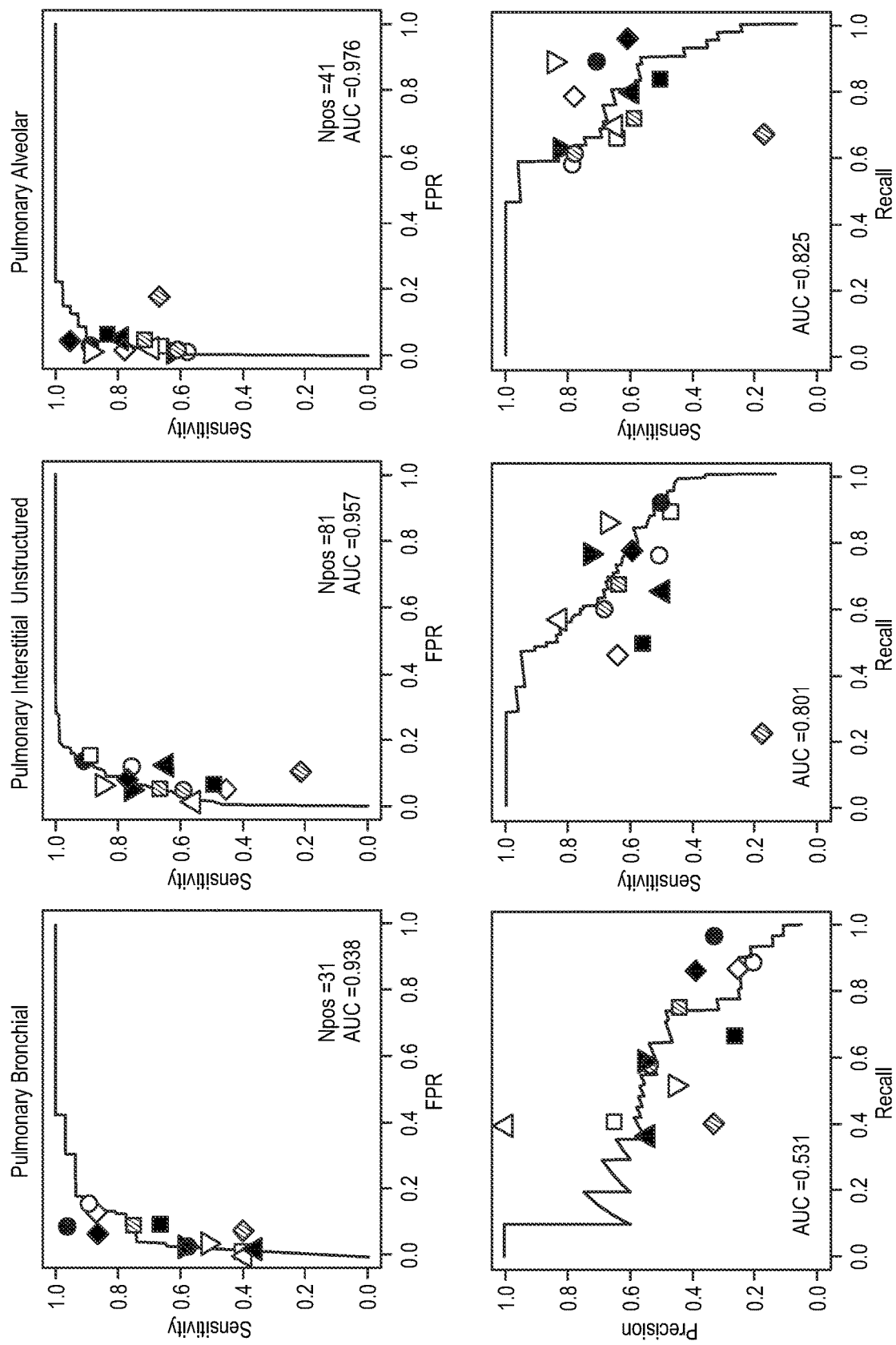
FIG. 14A illustrates a first set of ROC and PR curves for Pulmonary findings.
Figure 14B:
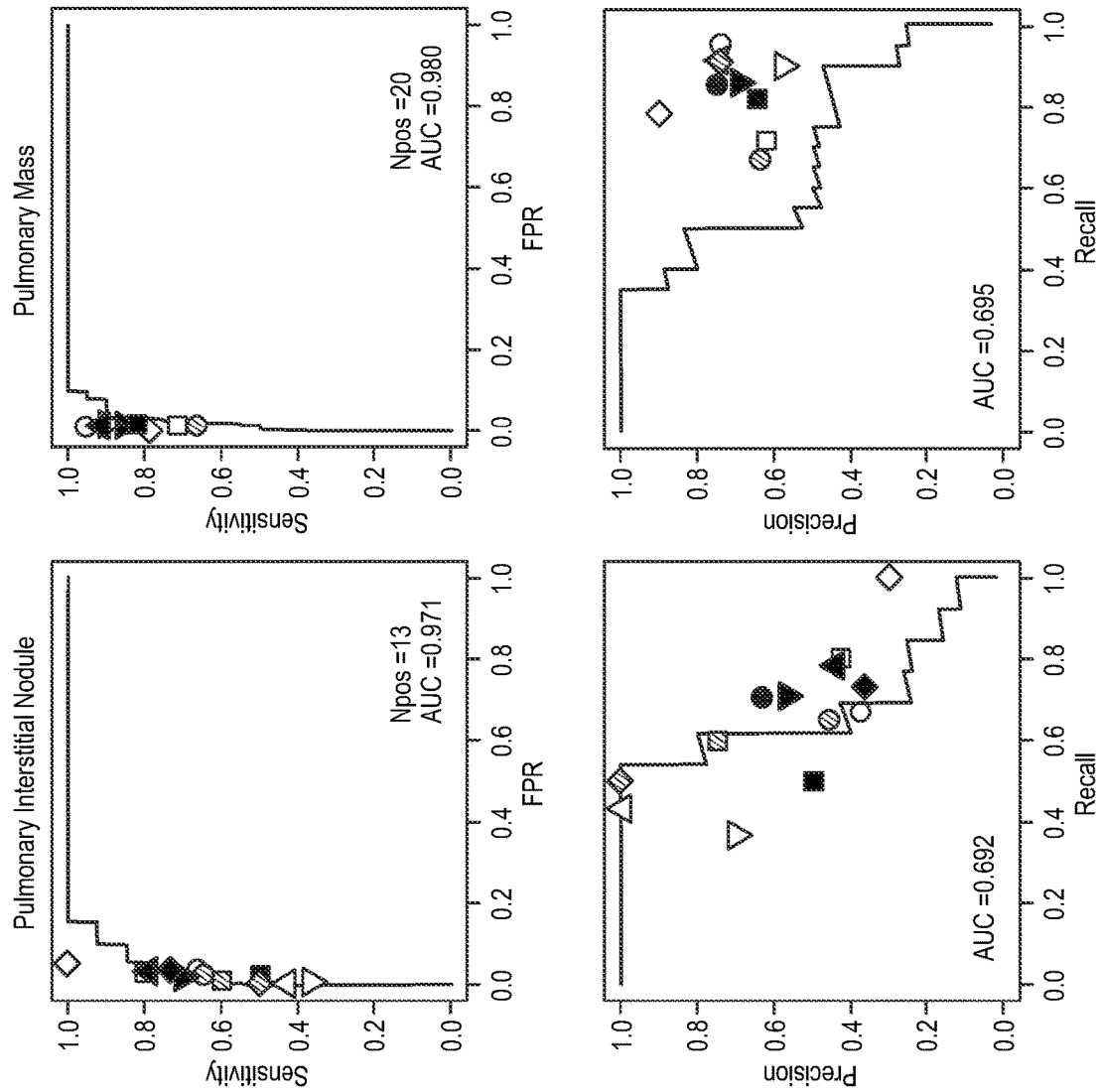
FIG. 14B illustrates a second set of ROC and PR curves for Pulmonary findings.
Figure 15A:
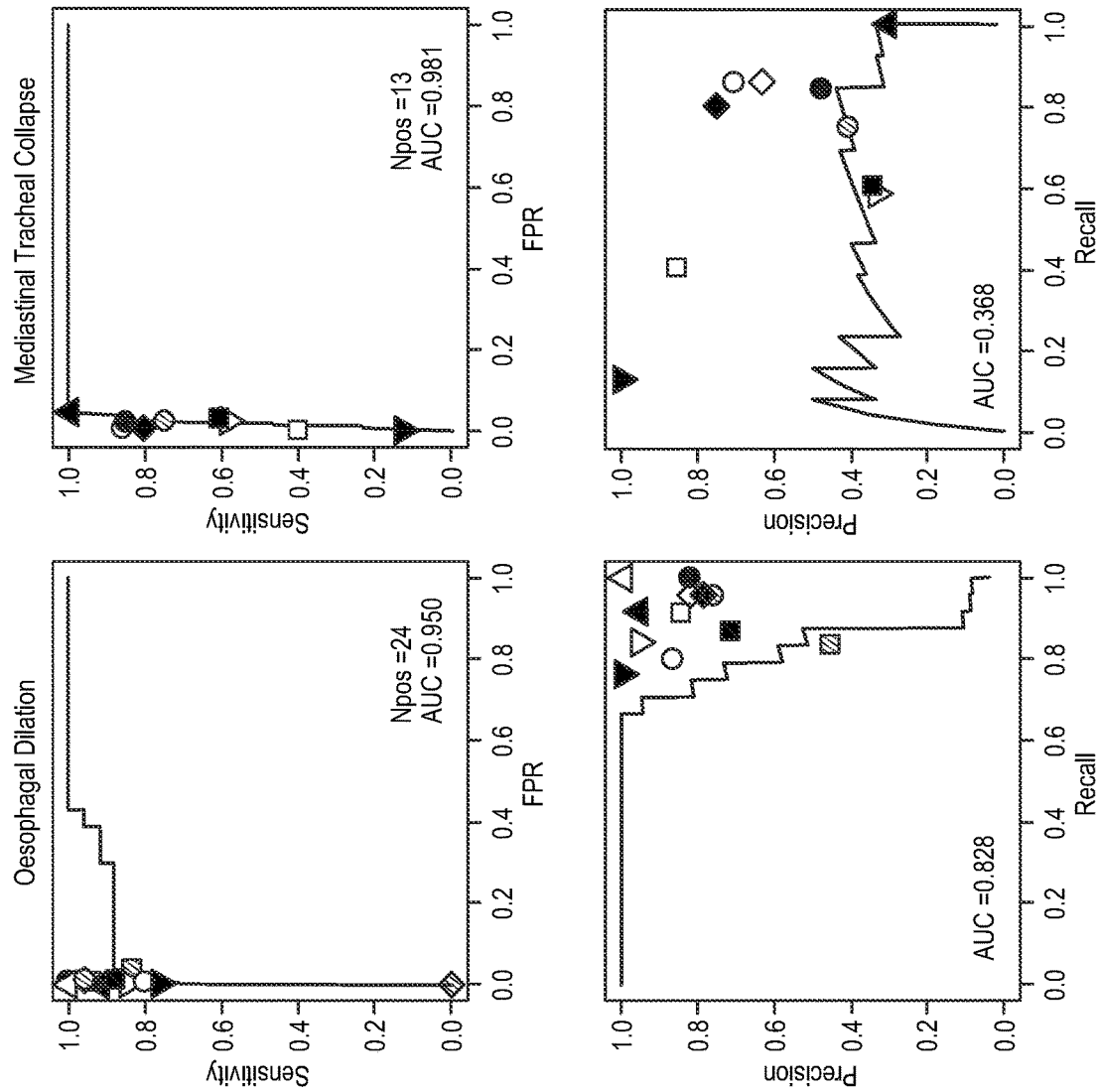
FIG. 15A illustrates a first set of ROC and PR curves for Mediastinal findings.
Figure 15B:
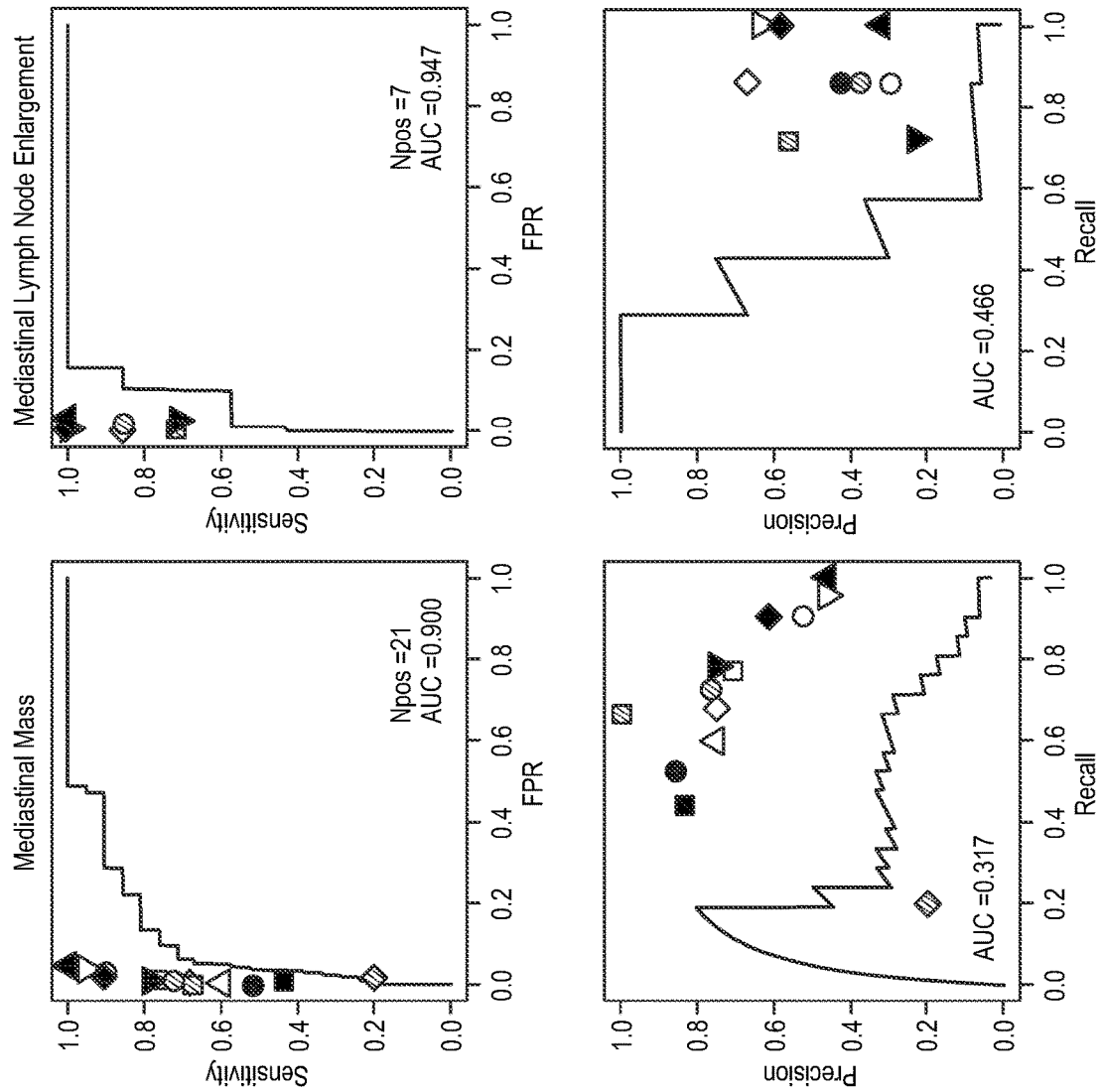
FIG. 15B illustrates a second set of ROC and PR curves for Mediastinal findings.
Figure 16A:
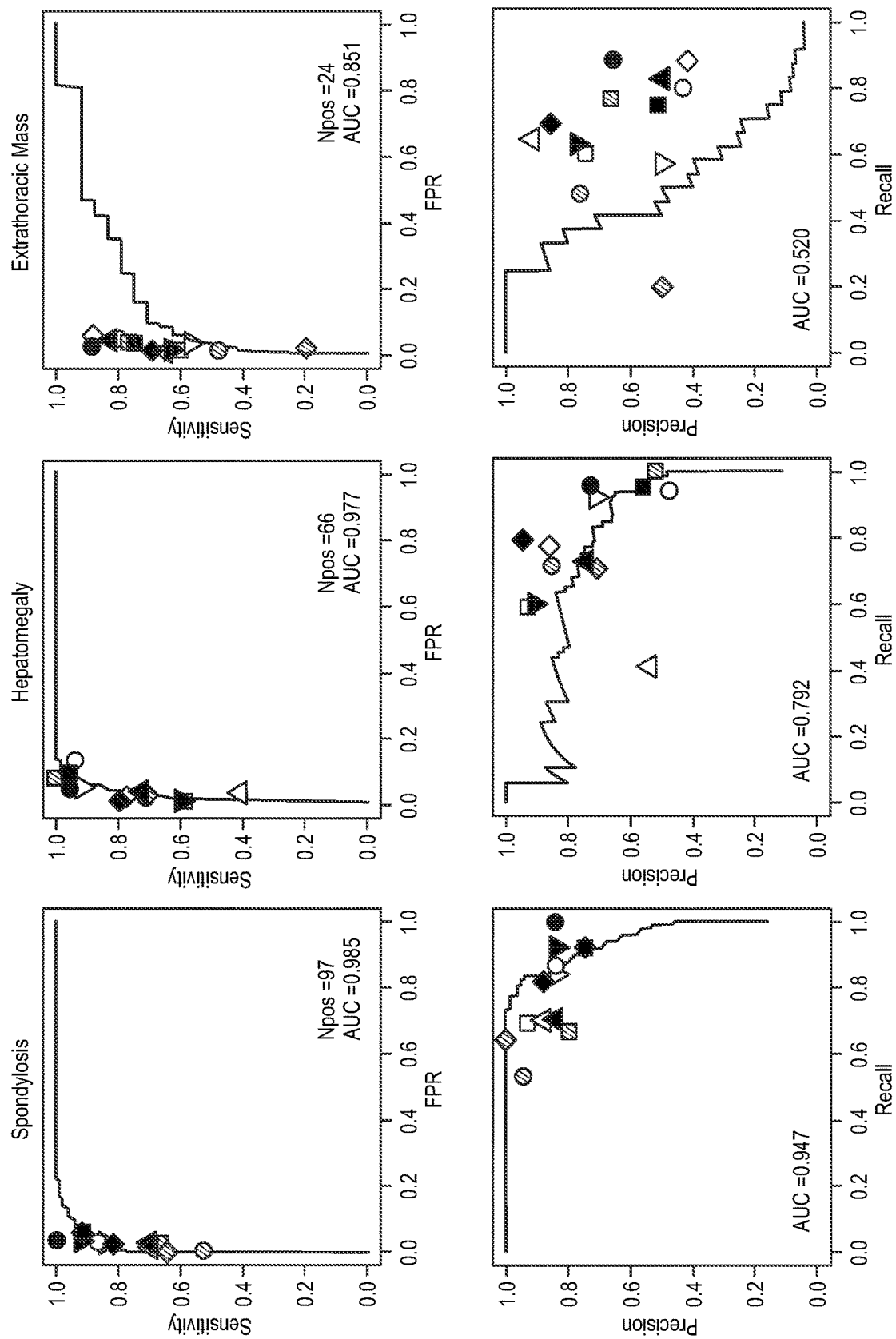
FIG. 16A illustrates a first set of ROC and PR curves for Extrathoracic findings.
Figure 16B:
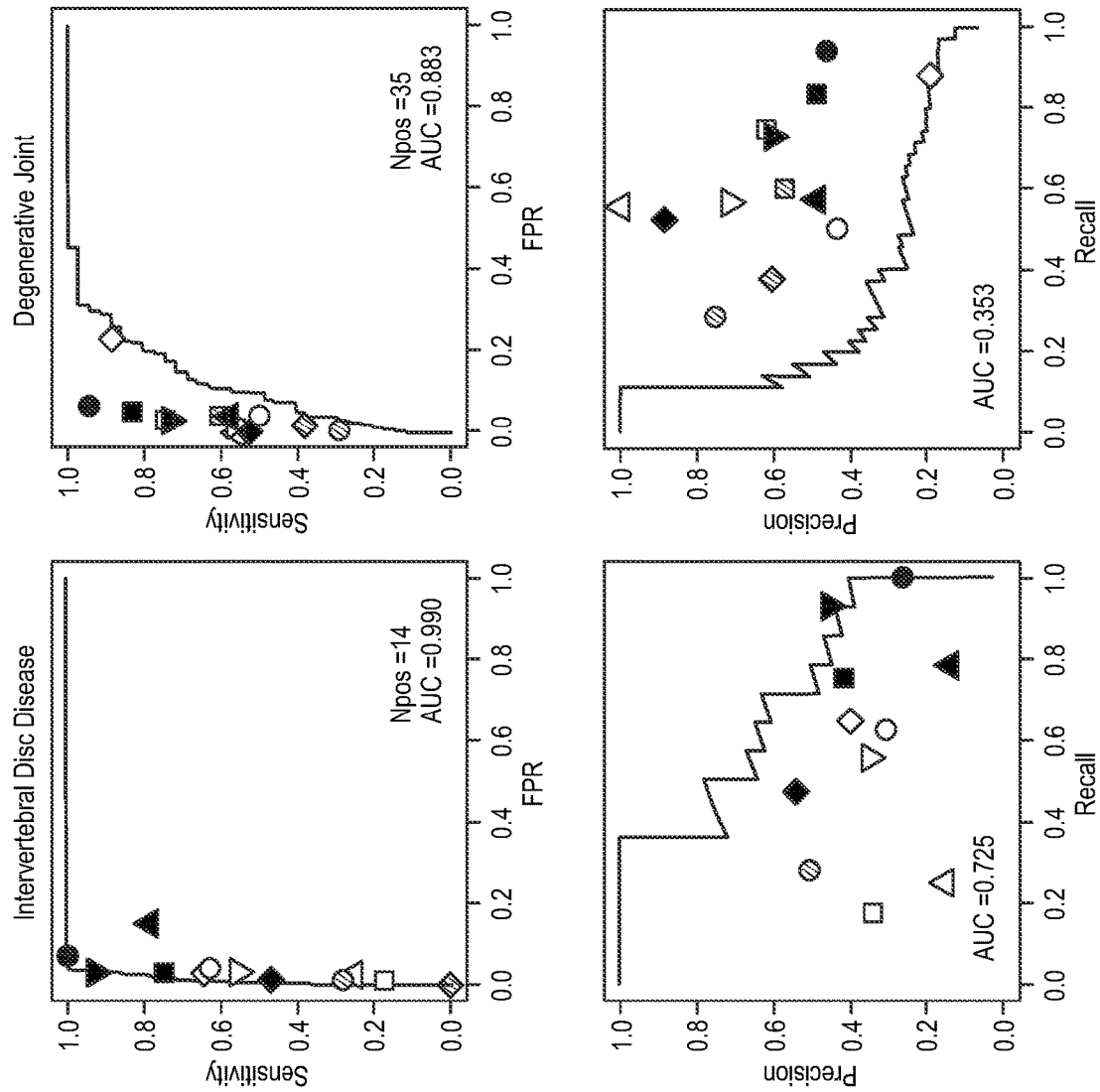
FIG. 16B illustrates a second set of ROC and PR curves for Extrathoracic findings.
Figure 17A:
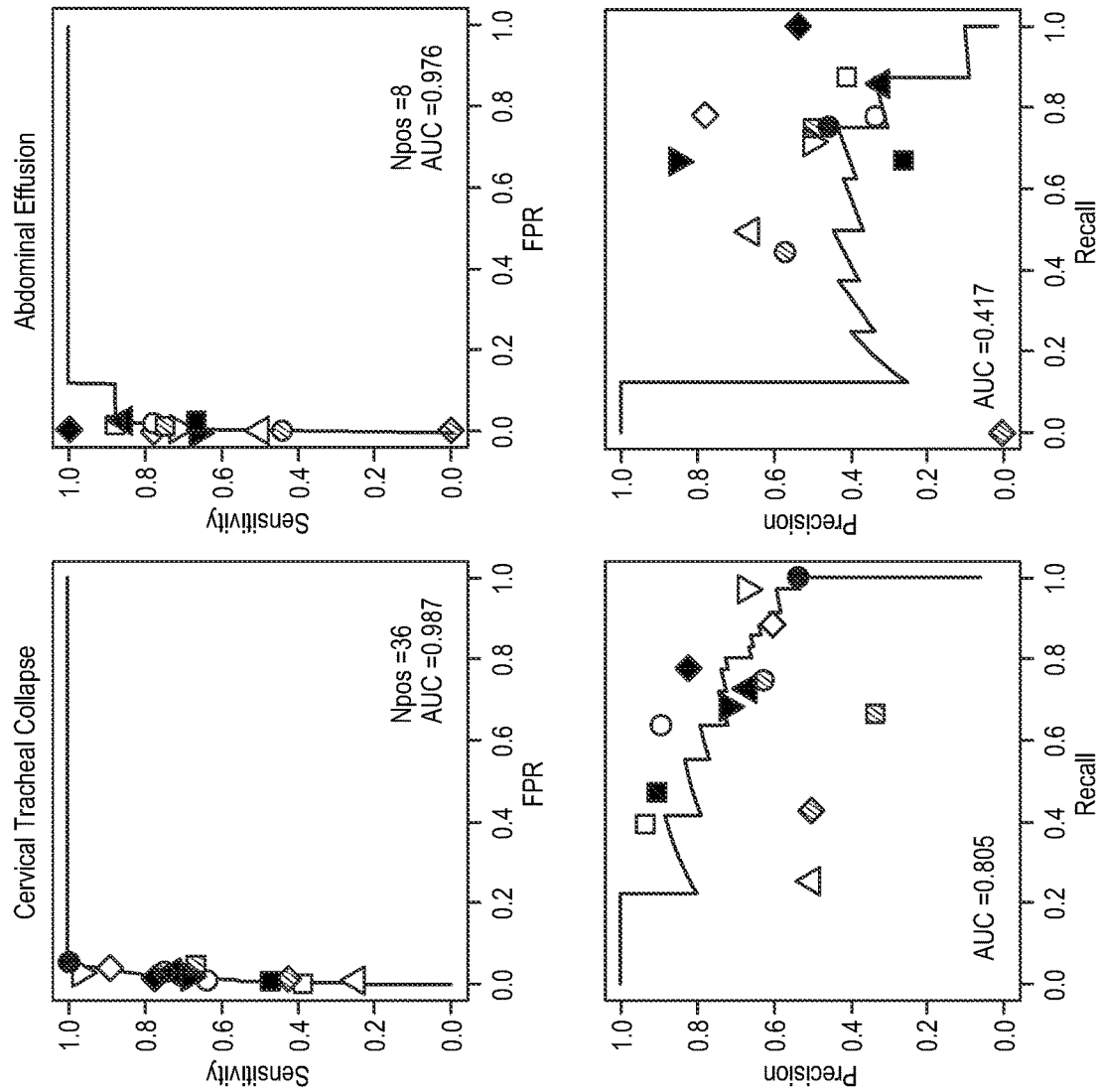
FIG. 17A illustrates a third set of ROC and PR curves for Extrathoracic findings.
Figure 17B:
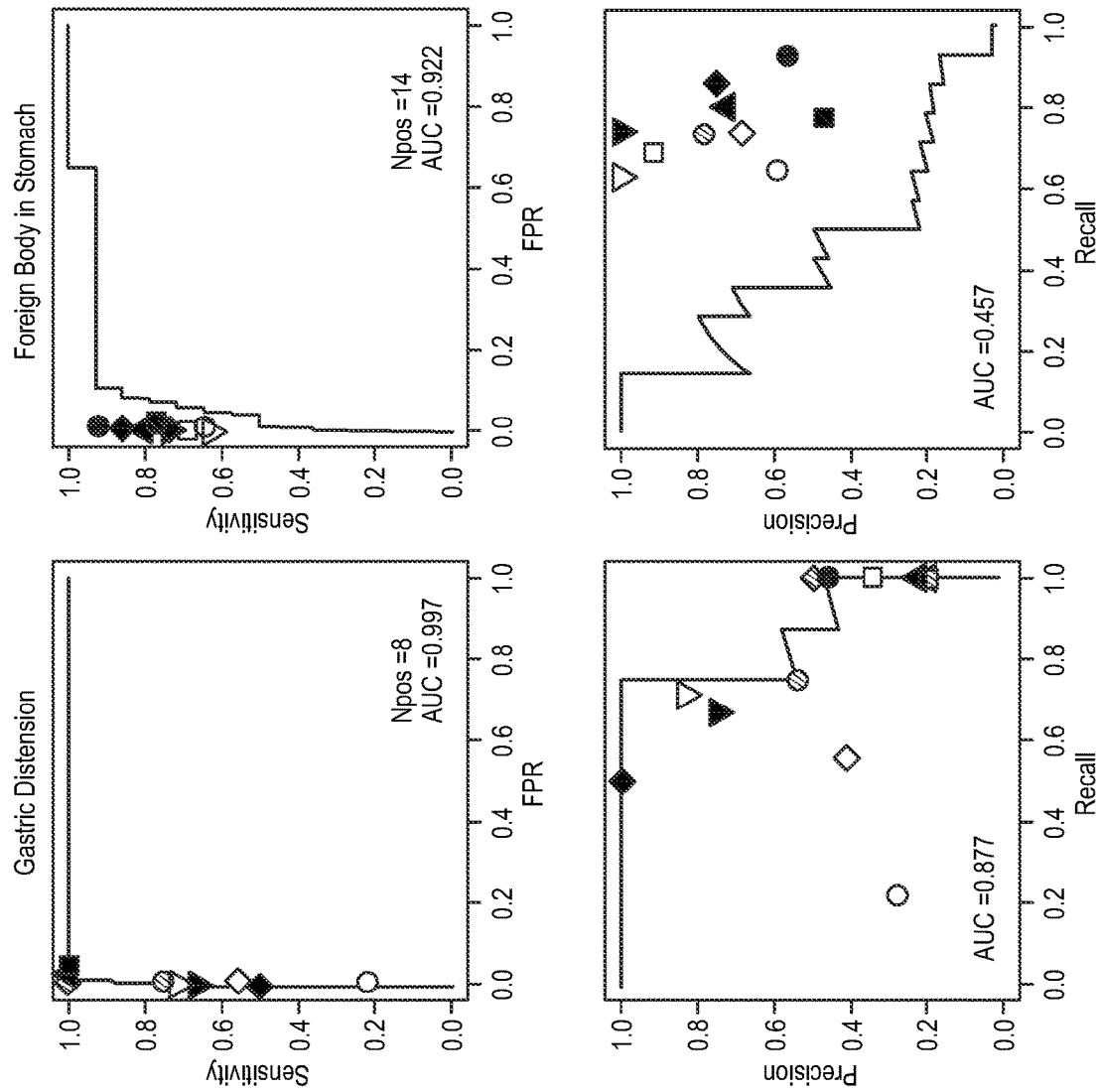
FIG. 17B illustrates a fourth set of ROC and PR curves for Extrathoracic findings.

FIGS. 13-17 show the result ROC and PR analysis results for the set of 615 images labeled by multiple radiologists, comparing model predictions against the radiologists' labels for Cardiovascular/Pleural Space Findings (FIGS. 13A & 13B); Pulmonary findings (FIG. 14 & FIG. 14B); Mediastinal findings (FIGS. 15A & 15B); and Extrathoracic Findings (FIGS. 16A & 16B). Each figure shows ROC (top) and PR (bottom) curves per-finding, and point estimates of each individual radiologist's FPR, Precision, and Recall (Sensitivity). Findings with fewer than five positive labels were not analyzed. Model accuracy can be comparable to the accuracy of an individual radiologists.

A longitudinal drift analysis was also undertaken. In this example, an autoencoder was trained using all archived images (see Sets 1 and 2 in Table 4), and then applied to the images from subsequent studies, checking the L2 reconstruction error of each.

Figure 18:
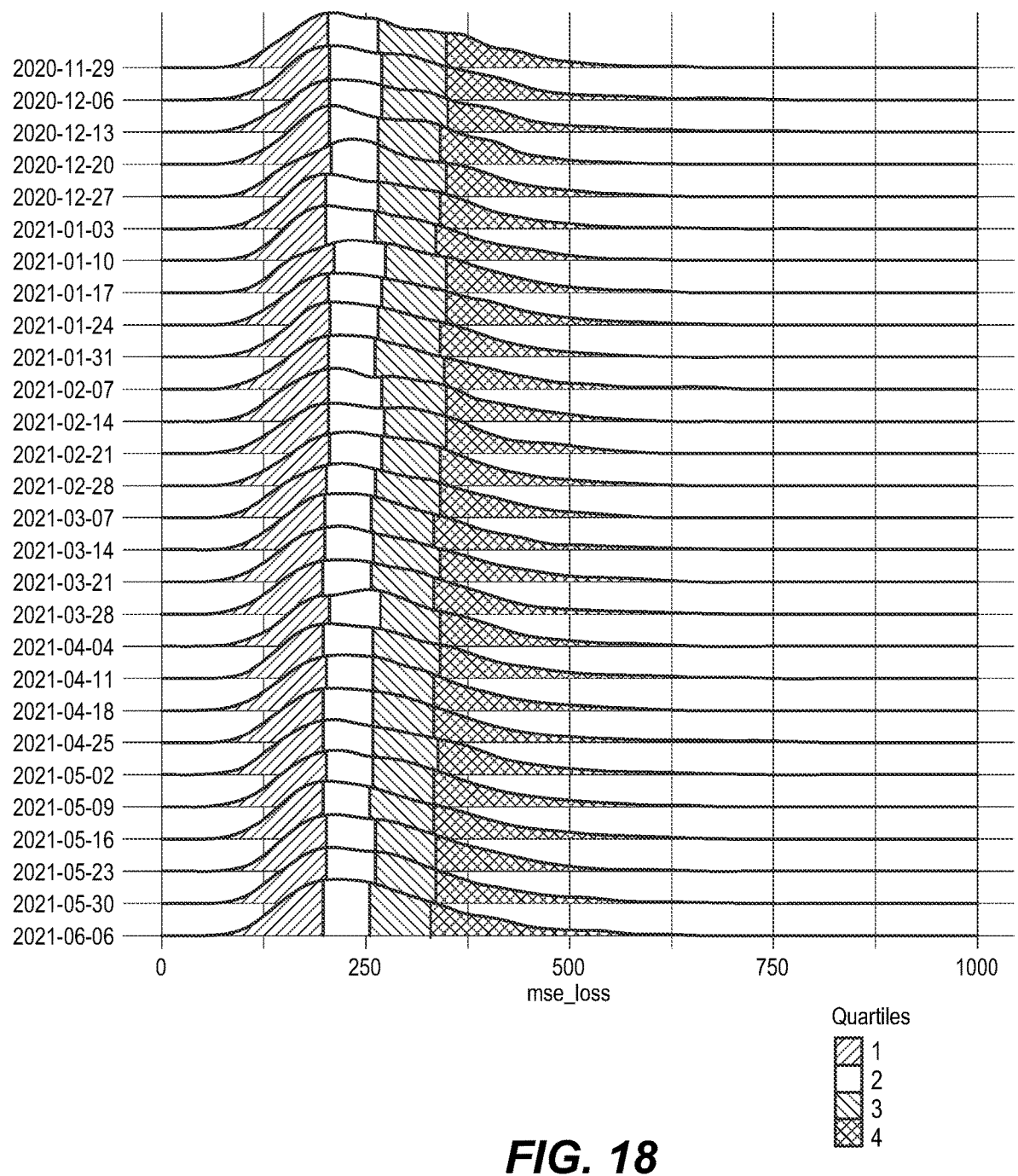
FIG. 18 illustrates a visualization of reconstruction error by week.

FIG. 18 illustrates a visualization of reconstruction error by week.

In particular, FIG. 18 shows the distribution and quantiles of L2 errors, grouped by week from November 2020, through June 2021. As depicted in the weekly graphs of FIG. 18, little-to-no difference between distributions was observed—indicating that input data have been consistent over the last year and suggesting that the model is robust to data from new clients. This lack of perceived drift can be attributed, in part, to the high diversity of organizations and animals represented in the training data.

Figure 19:
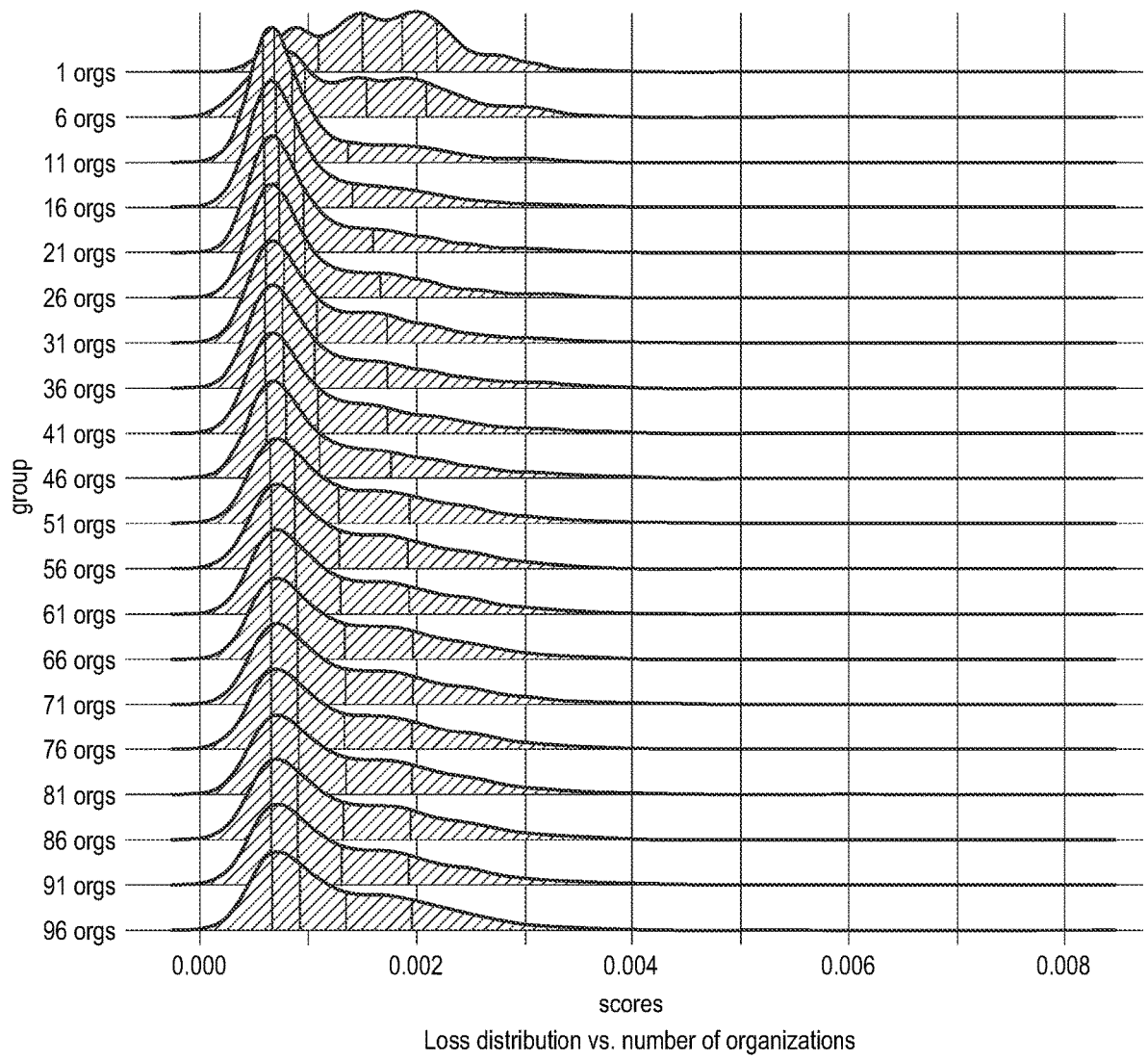
FIG. 19 illustrates a distribution of reconstruction error as a function of a number of organizations represented.

FIG. 19 illustrates a distribution of reconstruction error as a function of a number of organizations represented. In particular, FIG. 19 shows that data from a small number of organizations (1, 6, . . . , 16 orgs) do not appear to provide a good representation of the total diversity of the image data.

Notably, a positive relationship was observed between data size and model performance on an independent, hand labeled test set. An Efficient-Net-b5 was trained on differently sized subsets of the data and tested the resulting models on the same test set. Results can be observed in Table 6 and suggest the possibility of further performance gains with data scaling. Table 6 shows the metrics of the models on 30,477 unseen test data points against ground truth of one board certified radiologist. All data was labeled in a clinical production setting.

TABLE 6

Metrics of the models on 30,477 unseen test data points against ground truth of one board certified radiologist.

|  | Roc-AUC | PR-AUC |
|---|---|---|
| 20,000 images | 0.8765 | 0.3140 |
| 50,000 images | 0.8974 | 0.3706 |
| 100,000 images | 0.907 | 0.393 |
| 500,000 images | 0.912 | 0.404 |
| 1,000,000 images | 0.916 | 0.433 |
| 1,500,000 images | 0.920 | 0.443 |
| 2,000,000 images | 0.922 | 0.477 |
| 2,500,000 images | 0.926 | 0.488 |

Table 7 (below) shows the study-wise ROC results for each finding. The Npositive column lists the number of studies with at least one positive label (out of 9,311 total studies). Area under the Receive-Operator Curve (AUROC), False positive rate (FPR), and Sensitivity were not calculated for findings with fewer than 10 positive instances (Npositive).

TABLE 7

Study-wise ROC results for each finding.

|  | Npositive | AUROC | FPR @ 0.6 | Sensitivity @ 0.6 |
|---|---|---|---|---|
| Cardiomegaly | 915 | 0.986 | 0.025 | 0.923 |
| Left Atrial Enlargement | 738 | 0.988 | 0.016 | 0.912 |
| Left Ventricular Enlargement | 479 | 0.994 | 0.005 | 0.939 |
| Right Ventricular Enlargement | 167 | 0.971 | 0.005 | 0.694 |
| Right Atrial Enlargement | 90 | 0.984 | 0.003 | 0.767 |
| Main Palmory Artery Enlargement | 13 | 0.826 | 0 | 0.308 |
| Aortic Abnormality | 20 | 0.687 | 0 | 0 |
| Heart Base Mass Effect | 1 | n/a | n/a | n/a |
| Spondylosis | 2133 | 0.993 | 0.010 | 0.962 |
| Liver Abnormality | 1294 | 0.969 | 0.041 | 0.934 |
| Ex. Thoracic or abdomil mass | 502 | 0.060 | 0.017 | 0.843 |
| Sign(s) of IVDD | 810 | 0.951 | 0.018 | 0.806 |
| Gastric Foreign Material | 357 | 0.903 | 0.011 | 0.650 |
| Cervical Tracheal narrowing or Opacity | 632 | 0.983 | 0.015 | 0.897 |
| Degenerative Joint Disease | 900 | 0.945 | 0.037 | 0.810 |
| Decreased serosal detail | 410 | 0.964 | 0.010 | 0.793 |
| Gastric Distention | 500 | 0.975 | 0.012 | 0.912 |
| Aggressive Bone Lesion | 41 | 0.848 | 0.000 | 0.049 |
| Fracture and/or Luxation | 101 | 0.753 | 0 | 0 |
| Esophagal Dilation | 213 | 0.986 | 0.010 | 0.897 |
| Intrathoracic Tracheal rrowing | 323 | 0.974 | 0.010 | 0.796 |
| Tracheal Deviation | 252 | 0.985 | 0.003 | 0.825 |
| Mediastil Mass | 09 | 0.965 | 0.007 | 0.778 |
| Mediastil Lymph Node Enlargement (any) | 56 | 0.911 | 0.001 | 0.536 |
| Sign(s) of Pleural Elfusion | 238 | 0.985 | 0.010 | 0.924 |
| Pleural Mass Effect | 4 | n/a | n/a | n/a |
| Pneumothorax | 44 | 0.990 | 0.001 | 0.750 |
| Bronchial pattern | 1745 | 0.959 | 0.057 | 0.890 |
| Interstitial Unstructured | 1300 | 0.974 | 0.026 | 0.906 |
| Pulmory Alveolar | 798 | 0.986 | 0.018 | 0.910 |
| Pulmory Interstitial-Nodule (Under 1 cm) | 218 | 0.934 | 0.010 | 0.638 |
| Pulmory Vascular | 137 | 0.938 | 0.004 | 0.599 |
| Pulmory Mass (Over 1 cm) | 206 | 0.956 | 0.008 | 0.738 |
| Splenomegaly | 194 | 0.941 | 0.009 | 0.732 |
| Gastric Dilatation Volvulus | 11 | 0.970 | 0.000 | 0.818 |
| Microcardia | 75 | 0.968 | 0.005 | 0.773 |
| Mediastil Widening | 131 | 0.962 | 0.004 | 0.748 |
| Pleural Fissure Lines | 579 | 0.981 | 0.038 | 0.957 |
| Subcutaneous Nodale | 9 | n/a | n/a | n/a |
| Subcutaneous Mass | 77 | 0.960 | 0.001 | 0.506 |
| Fat Opacity Mass (e.g. lipoma) | 253 | 0.984 | 0.006 | 0.893 |

4.4 System Architecture and Methods for RapidReadNet in One Embodiment

An example infrastructure pipeline can rely on micro-services (rest-APIs) deployed using DOCKER containers. Each container can use the FastApi framework of Sebastian Ramirez in order to deploy a ReST API module, and each of them can serve a unique and specialized task. In one embodiment, a production pipeline includes an asynchronous processing approach using a message broker to accommodate a large amount of images to be processed each day (for example, around 15,000+). This can be achieved, for example, by using a NoSQL database that stores each individual incoming request, and by using Redis Queuer which is a background processing mechanism to consume in parallel each of the stored requests.

The predictions from the models can be returned in a JSON format and can be directly stored into a MongoDB database for long term archiving and a Redis JSON store for short term archiving. In other embodiments, the predictions can be stored in another sort of digital storage, such as a relational database, cloud storage, local hard drives, data lake, or other storage medium. In one non-limiting embodiment, using short-term storage (such as Redis JSON) can allow for the aggregation of results at the Study level along with inclusion of some contextualization aspects.

As best shown in FIG. 12, the micro-services can be managed through a DOCKER container executing code organized in functional elements such as: (1) message broker: pre-processing of upcoming requests, monitoring and dispatch, (2) models serving: AI orchestrator module, and individual models serving. The models can use the Pytorch framework, (3) results and feedback loop storage: contextualization of models results at study level, sending back of the results.

The message broker layer can include five DOCKER containers: (i) Redis queuer, (ii) Redis Database, (iii) Redis JSON, (iv) Redis Queue worker, and (v) Redis dashboard. Each incoming image is sent through the (i) Redis queuer module (which temporarily stores the image file along with its corresponding study-wide metadata locally on the disk) and adds an entry to the (ii) Redis database queue. In an embodiment, the Redis Queue workers execute in parallel to inspect the Redis database for new requests and to send them to the AI orchestrator. This architecture can serve at least 15000+ images a day.

The AI Orchestrator container can be programmed for coordinating the execution of the inferences from the different AI modules that have been described in other sections. In one embodiment, the first AI model from which predictions are collected is the AdjustNet (Model 1). In one embodiment, this Model 1 checks the orientation of the radiograph image. Next, the DxpassNet (Model 2) can validate that the image corresponds to the body part to which the architecture is predicting the findings for, which is the task from the RapidReadNet (a multi label classifier associated to the 41 labels corresponding to various pathologies, See Table 6). A contextualization of the results can be done using the study-wide metadata which were provided along with the image during the initial upload to the service. In an embodiment, to achieve this aggregation at study level, a record of all study-wide images inferences can be temporarily stored in the Redis JSON module, and a rule-based expert system tool can be used for management, such as the C Language Integrated Production System (CLIPS). In an embodiment with a rule-based expert system tool, the rules that are applied against the outputs of the models and animal metadata can be applied to obtain context data for the radiologist reports. In an embodiment, a PYTHON library can interact with C tools and rules are saved using the mongoDb database to support rule dynamism as new rules are created periodically. Other embodiments can use different programming languages, code libraries, or database types. Moreover, other embodiments implementing certain disclosed functions can comprise less, more, or different AI modules.

One embodiment can comprise a feedback storage loop. In one embodiment, all records can be (1) stored in a database, such as the mongoDb database specified above, in JSON format, (2) use an embedded pre- and post-deployment infrastructure, (3) include data specifying a number of clinics, radiologists using the disclosed system, (4) include workflow for radiologists to provide feedback on labels, (5) include methods for adding in new labels as data is acquired in a semi-supervised approach, and (6) include canary/shadow performance description of process.

Figure 20:
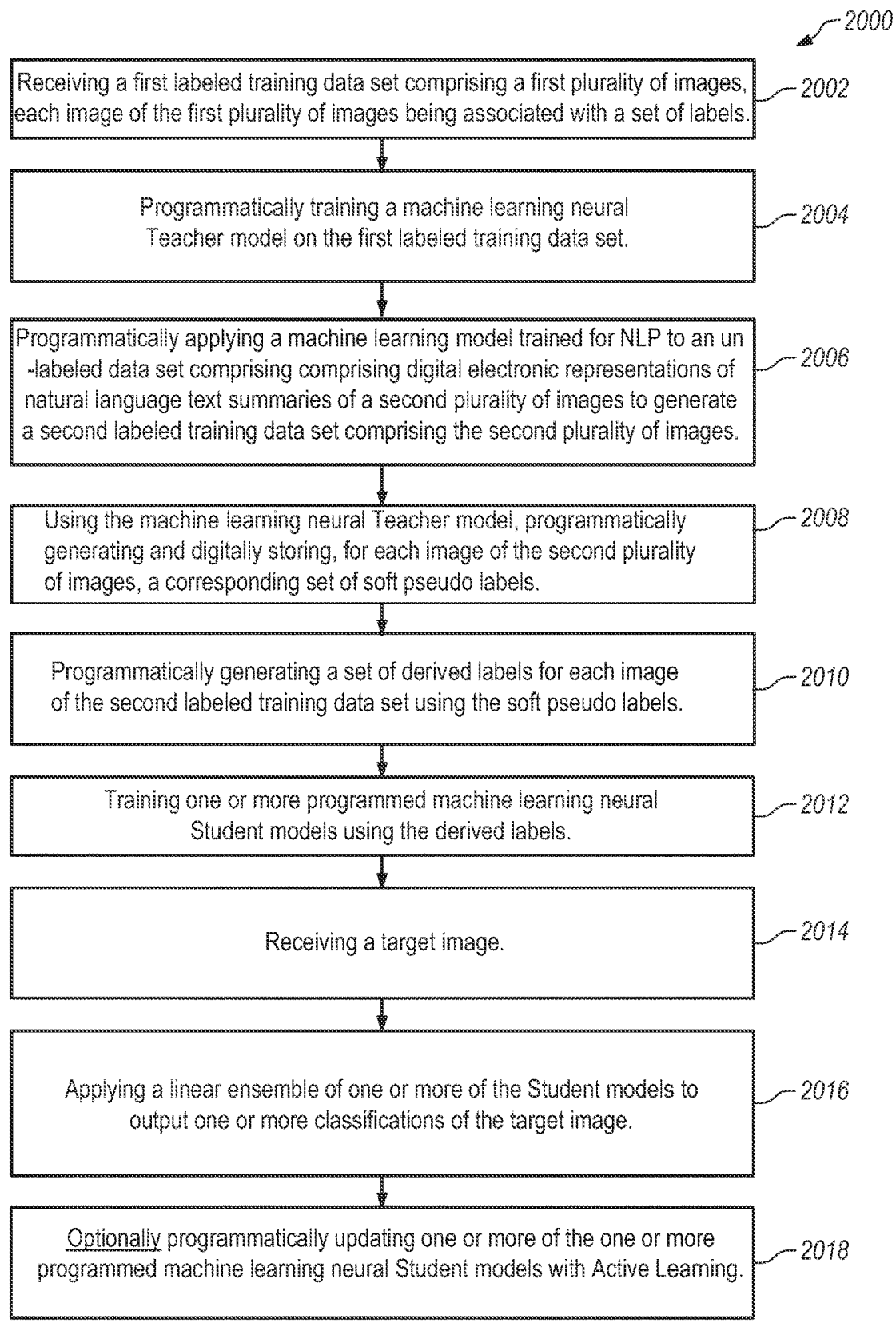
FIG. 20 illustrates an example computer-implemented or programmed method for classifying radiology images, such as animal and/or pet radiology images, using a machine learning neural model.

FIG. 20 illustrates an example computer-implemented or programmed method for classifying radiology images, such as animal and/or pet radiology images, using a machine learning neural model.

Method 2000 can be programmed to start at step 2002 which comprises receiving a first labeled training data set comprising a first plurality of images, each image of the first plurality of images being associated with a set of labels.

In an embodiment, programmatic control can dictate the execution of step 2004 which comprises programmatically training a machine learning neural Teacher model on the first labeled training data set.

In an embodiment, programmatic control can dictate the execution of step 2006 which comprises programmatically applying a machine learning model trained for NLP to an unlabeled data set comprising digital electronic representations of natural language text summaries of a second plurality of images, thereby generating a second labeled training data set comprising the second plurality of images.

In an embodiment, programmatic control can dictate the execution of step 2008 which comprises using the machine learning neural Teacher model, programmatically generating, for each image of the second plurality of images, a corresponding set of soft pseudo labels.

In an embodiment, programmatic control can dictate the execution of step 2010 which comprises programmatically generating a set of derived labels for each image of the second labeled training data set using the soft pseudo labels.

In an embodiment, programmatic control can dictate the execution of step 2012 which comprises training one or more programmed machine learning neural Student models using the derived labels. In an embodiment, programmatic control can dictate the execution of step 2014 which comprises receiving a target image.

In an embodiment, programmatic control can dictate the execution of step 2016 which comprises applying a linear ensemble of one or more of the Student models to output one or more classifications of the target image.

In an embodiment, programmatic control can dictate the execution of step 2018 which comprises optionally programmatically updating one or more of the one or more programmed machine learning neural Student models with Active Learning.

The embodiments disclosed herein are only examples, and the scope of this disclosure is not limited to them. Certain non-limiting embodiments can include all, some, or none of the components, elements, features, functions, operations, or steps of the embodiments disclosed herein.

5.0 Benefits of Certain Embodiments 5.1 Example Technical Benefits of RotationNet In certain embodiments, the disclosed data augmentation techniques significantly improved machine learning models for automated determination of correct anatomical orientation in veterinary radiographs. Indeed, in one embodiment, an ensemble of three machine learning models referred to as RotationNet achieved superior performance (e.g., error rate<0.01), outperforming reported state-of-the-art in related work. Further, successful deployment of the disclosed subject matter can reduce the need for manual intervention by clinical radiologists by at least about 10%, about 20%, about 30%, about 40%, or about 50%. The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

In one example, in a large teleradiology practice, approximately 3 million radiographs per year are received and interpreted, of which up to 20% lack properly encoded orientation information in the Digital Imaging and Communications in Medicine (DICOM) metadata or have errors in laterality markers leading to inaccurate image orientation at the time of interpretation; in aggregate this leads to a substantial effort by the radiologists to reorient the image in the viewer and raises the potential for significant downstream clinical decision-making errors. Because reported performance and reliance on laterality markers in traditional systems are insufficient for clinical translation and, additionally, prior work has not demonstrated real-world practice-based deployment data, new methods for automated image orientation that is agnostic to DICOM metadata with practice-based evidence is needed. In one embodiment, the disclosure provides such a novel system.

5.2 Example Technical Benefits of RapidReadNet and the Disclosed End-to-End System for Classifying Pet Radiology Images of One Embodiment Embodiments of the disclosed technology can permit the detection of pre-defined clinical findings in canine and feline radiographs through modeling and methods for data distillation that combines automated labeling with distillation and show performance enhancements against an automated-labeling-only approach. In this disclosure, data scaling and its interaction with different models are assessed. An embodiment's performance over time is assessed and compared to input drift over time. The deployment process and the embedding of an embodiment in a larger deep learning-based platform for x-ray image processing is discussed herein. As described herein, using a Noisy Radiologist Student can boost robustness in X-Ray image prediction. Application of high-performance deep learning diagnosis systems at scale in veterinary care can provide critical insights that can serve to address the gap in translation for these promising technologies in human and veterinary medical imaging diagnostics into clinical practice.

The disclosure provides innovation in key areas. In one example, randomly initialized networks can be superior to those pre-trained on ImageNet, and joint training of augmented data and real data together can outperform a pre-train-finetune pipeline. Pre-training with ImageNet (which uses rotations and flips as data augmentations) during training can induce invariance to re-orientations of an image and limit model development for this task in medical images. Further, pre-training on augmented data can bias a network towards certain features that indicate a synthetically oriented image, while joint training can act as a regularization technique to avoid these biases. Additionally, the approaches described in the context of embodiments comprising AdjustNet and/or RotationNet and/or RapidReadNet neural models demonstrate significant performance advantages. The disclosure provides, among other things, a specialized networks ensemble approach for each task which can be capable of independent optimization and targeted augmentation for model training. For example, the disclosed techniques were successfully deployed for radiographs from over 4600 hospitals across 24+ countries and were shown to reduce the need for manual image manipulation by more than 50%, demonstrating both feasibility and a significant positive impact to overall workflow efficiency.

More generally, deep learning model development for medical imaging can require significant effort in data curation, which can be made considerably more difficult as the DICOM headers of archival data are frequently mislabeled or incomplete. In one embodiment, the disclosure provides a method to achieve automated image orientation in practice. In other embodiments, the disclosed techniques can be used to provide feedback to clinics regarding incorrect orientation, errors in DICOM metadata, or incorrect laterality markers. As such, various embodiments comprising AdjustNet and/or RotationNet and/or RapidReadNet could be used to retrospectively encode a large number of exams without DICOM or laterality data automatically and can be useful for a variety of tasks. In one example, embodiments comprising AdjustNet and/or RotationNet and/or RapidReadNet can be applied at the point-of-care as feedback to the radiographer for immediate and consistent feedback applications rather than after submission for interpretation holds the potential to improve awareness and baseline functioning for reducing errors (for example, flagging errors).

In conclusion, automated medical imaging DICOM orientation using AdjustNet and/or RotationNet or RapidReadNet can achieve an error rate of less than 0.01 and reduce the need for human-expert intervention for image orientation by 50% on average. The disclosed subject matter includes a novel end-to-end machine learning approach to optimizing radiographic orientation, such that all images are always presented with the correct orientation, with significant efficiency gains at scale in deployment.

6.0 Implementation Example— Hardware Overview

Figure 4:
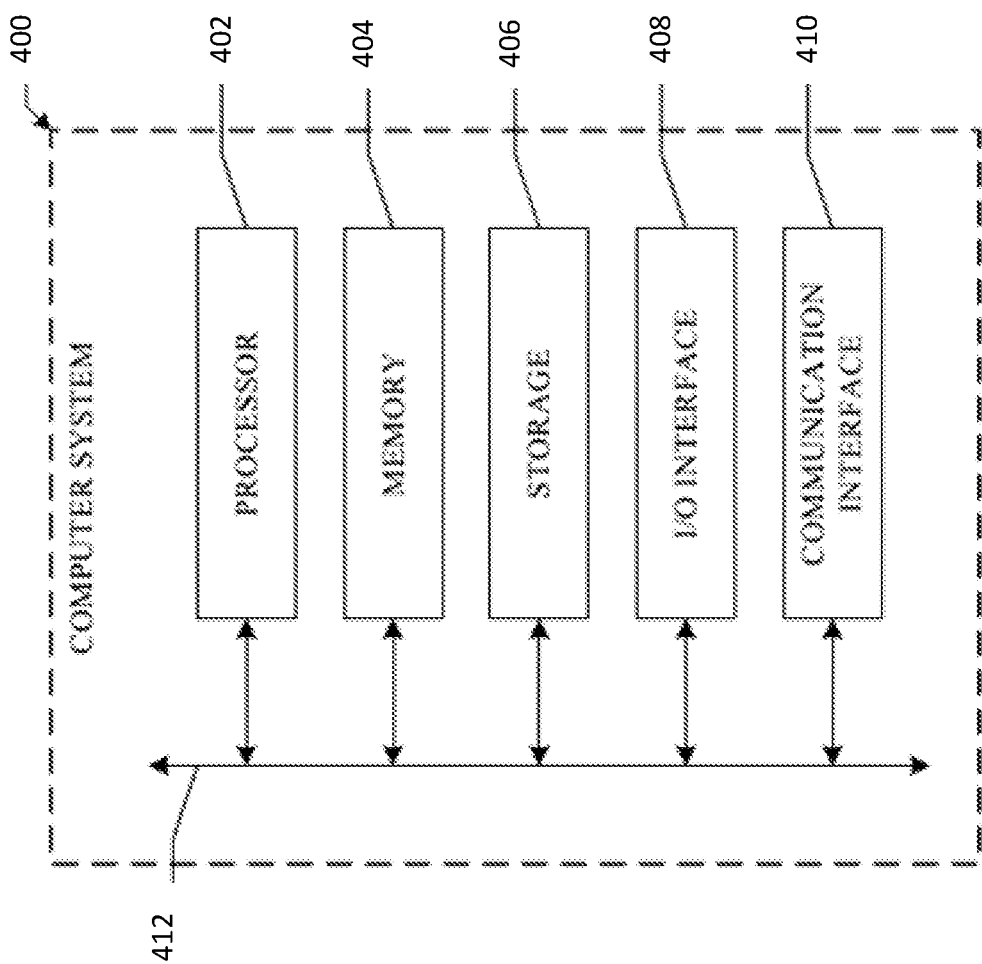
FIG. 4 illustrates an example computer system or device used to facilitate classification and labelling of images of animals or pets.

FIG. 4 illustrates an example computer system 400 used to assess pet or animal radiology images using machine learning tools, according to some non-limiting embodiments. In certain non-limiting embodiments, one or more computer systems 400 perform one or more steps of one or more methods described or illustrated herein. In certain other non-limiting embodiments, one or more computer systems 400 provide functionality described or illustrated herein. In certain non-limiting embodiments, software running on one or more computer systems 400 performs one or more steps of one or more methods described or illustrated herein or provides functionality described or illustrated herein. Some non-limiting embodiments include one or more portions of one or more computer systems 400. Herein, reference to a computer system can encompass a computing device, and vice versa, where appropriate. Moreover, reference to a computer system can encompass one or more computer systems, where appropriate.

This disclosure contemplates any suitable number of computer systems 400. This disclosure contemplates computer system 400 taking any suitable physical form. As example and not by way of limitation, computer system 400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 can include one or more computer systems 400; be unitary or distributed; span multiple locations; span multiple machines; span multiple data centers; or reside in a cloud, which can include one or more cloud components in one or more networks. Where appropriate, one or more computer systems 400 can perform without substantial spatial or temporal limitation one or more steps of one or more methods described or illustrated herein. As an example, and not by way of limitation, one or more computer systems 400 can perform in real time or in batch mode one or more steps of one or more methods described or illustrated herein. One or more computer systems 400 can perform at different times or at different locations one or more steps of one or more methods described or illustrated herein, where appropriate.

In certain non-limiting embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In some non-limiting embodiments, processor 402 includes hardware for executing instructions, such as those making up a computer program. As an example and not by way of limitation, to execute instructions, processor 402 can retrieve (or fetch) the instructions from an internal register, an internal cache, memory 404, or storage 406; decode and execute them; and then write one or more results to an internal register, an internal cache, memory 404, or storage 406. In certain non-limiting embodiments, processor 402 can include one or more internal caches for data, instructions, or addresses. This disclosure contemplates processor 402 including any suitable number of any suitable internal caches, where appropriate. As an example, and not by way of limitation, processor 402 can include one or more instruction caches, one or more data caches, and one or more translation lookaside buffers (TLBs). Instructions in the instruction caches can be copies of instructions in memory 404 or storage 406, and the instruction caches can speed up retrieval of those instructions by processor 402. Data in the data caches can be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches can speed up read or write operations by processor 402. The TLBs can speed up virtual-address translation for processor 402. In some non-limiting embodiments, processor 402 can include one or more internal registers for data, instructions, or addresses. This disclosure contemplates processor 402 including any suitable number of any suitable internal registers, where appropriate. Where appropriate, processor 402 can include one or more arithmetic logic units (ALUs); be a multi-core processor; or include one or more processors 402. Although this disclosure describes and illustrates a particular processor, this disclosure contemplates any suitable processor.

In some non-limiting embodiments, memory 404 includes main memory for storing instructions for processor 402 to execute or data for processor 402 to operate on. As an example, and not by way of limitation, computer system 400 can load instructions from storage 406 or another source (such as, for example, another computer system 400) to memory 404. Processor 402 can then load the instructions from memory 404 to an internal register or internal cache. To execute the instructions, processor 402 can retrieve the instructions from the internal register or internal cache and decode them. During or after execution of the instructions, processor 402 can write one or more results (which can be intermediate or final results) to the internal register or internal cache. Processor 402 can then write one or more of those results to memory 404. In some non-limiting embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which can each include an address bus and a data bus) can couple processor 402 to memory 404. Bus 412 can include one or more memory buses, as described below. In certain non-limiting embodiments, one or more memory management units (MMUs) reside between processor 402 and memory 404 and facilitate accesses to memory 404 requested by processor 402. In certain other non-limiting embodiments, memory 404 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 404 can include one or more memories 404, where appropriate. Although this disclosure describes and illustrates a particular memory component, this disclosure contemplates any suitable memory.

In some non-limiting embodiments, storage 406 includes mass storage for data or instructions. As an example and not by way of limitation, storage 406 can include a hard disk drive (HDD), a floppy disk drive, flash memory, an optical disc, a magneto-optical disc, magnetic tape, or a Universal Serial Bus (USB) drive or a combination of two or more of these. Storage 406 can include removable or non-removable (or fixed) media, where appropriate. Storage 406 can be internal or external to computer system 400, where appropriate. In certain non-limiting embodiments, storage 406 is non-volatile, solid-state memory. In some non-limiting embodiments, storage 406 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 can include one or more storage control units facilitating communication between processor 402 and storage 406, where appropriate. Where appropriate, storage 406 can include one or more storages 406. Although this disclosure describes and illustrates particular storage, this disclosure contemplates any suitable storage.

In certain non-limiting embodiments, I/O interface 408 includes hardware, software, or both, providing one or more interfaces for communication between computer system 400 and one or more I/O devices. Computer system 400 can include one or more of these I/O devices, where appropriate. One or more of these I/O devices can enable communication between a person and computer system 400. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces 408 for them. Where appropriate, I/O interface 408 can include one or more device or software drivers enabling processor 402 to drive one or more of these I/O devices. I/O interface 408 can include one or more I/O interfaces 408, where appropriate. Although this disclosure describes and illustrates a particular I/O interface, this disclosure contemplates any suitable I/O interface.

In some non-limiting embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 400 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 can include any suitable communication interface 410 for any of these networks, where appropriate. Communication interface 410 can include one or more communication interfaces 410, where appropriate. Although this disclosure describes and illustrates a particular communication interface, this disclosure contemplates any suitable communication interface.

In certain non-limiting embodiments, bus 412 includes hardware, software, or both coupling components of computer system 400 to each other. As an example and not by way of limitation, bus 412 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 can include one or more buses 412, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates some non-limiting embodiments as providing particular advantages, certain non-limiting embodiments can provide none, some, or all of these advantages.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

The embodiments disclosed herein are only examples, and the scope of this disclosure is not limited to them. Certain non-limiting embodiments can include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

All patents, patent applications, publications, product descriptions, and protocols, cited in this specification are hereby incorporated by reference in their entireties. In case of a conflict in terminology, the present disclosure controls.

While it will become apparent that the subject matter herein described is well calculated to achieve the benefits and advantages set forth above, the presently disclosed subject matter is not to be limited in scope by the specific embodiments described herein. It will be appreciated that the disclosed subject matter is susceptible to modification, variation, and change without departing from the spirit thereof. Those skilled in the art will recognize or be able to ascertain using no more than routine experimentation, many equivalents to the specific embodiments described herein. Such equivalents are intended to be encompassed by the following claims.

Various references are cited in this document, which are hereby incorporated by reference in their entireties herein.

What is claimed is:

1. A computer-implemented method, comprising:
receiving a first labeled training data set comprising a first plurality of digitally stored images, each image of the first plurality of digitally stored images being associated with a set of labels;
training a machine learning neural Teacher model on the first labeled training data set;
applying a machine learning model trained for natural language processing to an unlabeled data set comprising digital electronic representations of natural language text summaries of a second plurality of images, thereby generating a second labeled training data set comprising the second plurality of images;
using the machine learning neural Teacher model, generating, for each image of the second plurality of images, a corresponding set of soft pseudo labels;
generating a set of derived labels for each image of the second labeled training data set using the set of soft pseudo labels;
training one or more programmed machine learning neural Student models using the set of derived labels;
receiving a target image; and
applying an ensemble of one or more of the one or more programmed machine learning neural Student models to output one or more classifications of the target image.

2. The computer-implemented method of claim 1, further comprising programmatically updating at least one of the one or more programmed machine learning neural Student models using Active Learning.

3. The computer-implemented method of claim 1, further comprising applying noise at one or more machine learning model training steps.

4. The computer-implemented method of claim 1, wherein the target image is a radiographic image of an animal or a pet, and wherein each image of the first plurality of images and each image of the second plurality of images is a radiographic image of an animal or pet.

5. The computer-implemented method of claim 1, wherein the natural language text summaries are radiology reports.

6. The computer-implemented method of claim 1, wherein the target image is formatted as a Digital Imaging and Communications in Medicine ("DICOM") image.

7. The computer-implemented method of claim 1, further comprising using an infrastructure pipeline comprising micro-services deployed using docker containers.

8. The computer-implemented method of claim 1, wherein at least one of the machine learning neural Student models or the machine learning neural Teacher model is programmed to comprise an architecture that comprises at least one of DenseNet-121, ResNet-152, ShuffleNet2, ResNext101, GhostNet, EfficientNet-b5, SeNet-154, Se-ResNext-101, or Inception-v4.

9. The computer-implemented method of claim 1, wherein at least one of the machine learning neural Student models or the machine learning neural Teacher model is programmed as a convolutional neural network.

10. The computer-implemented method of claim 1, wherein one of the one or more classifications of the target image indicates one of healthy or abnormal tissue.

11. The computer-implemented method of claim 10, wherein:
one of the one or more classifications of the target image indicates abnormal tissue; and
the indicated abnormal tissue is further classified as at least one of cardiovascular, pulmonary structure, mediastinal structure, pleural space, or extra thoracic.

12. The computer-implemented method of claim 1, wherein at least one of the one or more classifications of the target image is a subclassification.

13. The computer-implemented method of claim 1, further comprising pre-preprocessing the target image, wherein said pre-processing comprises applying a trained machine learning filter model to the target image before outputting the one or more classifications of the target image.

14. The computer-implemented method of claim 1, further comprising programmatically determining a correct anatomical orientation of the target image before outputting the one or more classifications of the target image.

15. The computer-implemented method of claim 14, wherein the determining the correct anatomical orientation of the target image comprises executing a trained machine learning model programmed to operate without relying on either DICOM metadata associated with the target image or a laterality marker associated with the target image.

16. The computer-implemented method of claim 15, wherein the trained machine learning model was jointly trained on augmented data and real data.

17. The computer-implemented method of claim 14, wherein the determining the correct anatomical orientation of the target image comprises determining a correct rotation of the target image by executing a first programmed model and determining a correct flip of the target image by executing a second programmed model.

18. The computer-implemented method of claim 14, further comprising programmatically validating that the target image corresponds to a correct body part after determining the correct anatomical orientation of the target image and before outputting the one or more classifications of the target image.

19. The computer-implemented method of claim 18, wherein the validating that the target image corresponds to the correct body part comprises executing a trained machine learning model.

20. A system comprising:
one or more processors; and
one or more computer-readable non-transitory storage media coupled to one or more of the processors and comprising instructions operable when executed by one or more of the processors to cause the system to perform operations comprising:
receiving a first labeled training data set comprising a first plurality of digitally stored images, each image of the first plurality of digitally stored images being associated with a set of labels;
training a machine learning neural Teacher model on the first labeled training data set;
applying a machine learning model trained for natural language processing to an unlabeled data set comprising digital electronic representations of natural language text summaries of a second plurality of images, thereby generating a second labeled training data set comprising the second plurality of images;
using the machine learning neural Teacher model, generating, for each image of the second plurality of images, a corresponding set of soft pseudo labels;
generating a set of derived labels for each image of the second labeled training data set using the set of soft pseudo labels;
training one or more programmed machine learning neural Student models using the set of derived labels;
receiving a target image; and
applying an ensemble of one or more of the one or more programmed machine learning neural Student models to output one or more classifications of the target image.

* * * * *